US012578446B2

(12) United States Patent
Laster

(10) Patent No.: US 12,578,446 B2
(45) Date of Patent: Mar. 17, 2026

(54) DYNAMIC CHART ADJUSTMENT USING MARINE DATA

(71) Applicant: Navico, Inc., Tulsa, OK (US)

(72) Inventor: Matthew W. Laster, Broken Arrow, OK (US)

(73) Assignee: Navico, Inc., Tulsa, OK (US)

( * ) Notice: Subject to any disclaimer, the term of this patent is extended or adjusted under 35 U.S.C. 154(b) by 227 days.

(21) Appl. No.: 18/185,516

(22) Filed: Mar. 17, 2023

(65) Prior Publication Data

US 2024/0310501 A1    Sep. 19, 2024

(51) Int. Cl.
| | |
|---|---|
| *G01S 7/62* | (2006.01) |
| *G01S 15/89* | (2006.01) |
| *G06T 3/40* | (2024.01) |
| *G06T 11/60* | (2006.01) |

(52) U.S. Cl.
CPC .......... *G01S 7/6272* (2013.01); *G01S 7/6245* (2013.01); *G01S 15/89* (2013.01); *G06T 3/40* (2013.01); *G06T 11/60* (2013.01)

(58) Field of Classification Search
CPC ...... G01S 7/6245; G01S 7/6272; G01S 15/89; G01S 7/6218; G01S 15/8902; G01S 15/96; G06T 3/40; G06T 11/60
USPC ........................................................ 367/88
See application file for complete search history.

(56) References Cited

U.S. PATENT DOCUMENTS

| | | | |
|---|---|---|---|
| 4,425,635 A | | 1/1984 | Yamamoto et al. |
| 5,184,330 A | * | 2/1993 | Adams .................. G01S 7/6245 |
| | | | 367/111 |

| | | | |
|---|---|---|---|
| 6,520,105 B2 | 2/2003 | Koda et al. |
| 7,355,924 B2 | 4/2008 | Zimmerman et al. |
| 7,606,114 B2 | 10/2009 | Bachelor et al. |
| 8,645,012 B2 | 2/2014 | Salmon et al. |
| 8,761,976 B2 | 6/2014 | Salmon et al. |

(Continued)

FOREIGN PATENT DOCUMENTS

| | | |
|---|---|---|
| AU | 2019203322 A1 | 12/2019 |
| CA | 3042656 A1 | 11/2019 |

(Continued)

OTHER PUBLICATIONS

"Teledyne SeaBotix—SmartFlight 2.0"; YouTube; Apr. 13, 2018; retrieved from https://www.youtube.com/watch?v=xFJ2OCKIXwc.

(Continued)

*Primary Examiner* — Yuqing Xiao
*Assistant Examiner* — Christopher Richard Walker

(57) ABSTRACT

Systems and methods for presenting marine data are provided herein. The system comprises at least one sonar transducer associated with a watercraft, a display, one or more processors and a memory. The memory including computer program code configured to cause presentation of a chart on the display including at least a portion of the body of water, at a first zoom level. The system further causes emission of one or more sonar beams by the at least one sonar transducer and receives sonar data corresponding to the sonar returns received by the at least one sonar transducer. The system generates and presents a sonar image based on a sonar image scale. The system automatically adjusts the presentation of the chart to a second zoom level that corresponds to the sonar image scale. The second zoom level being different than the first zoom level.

12 Claims, 22 Drawing Sheets

(56) References Cited

U.S. PATENT DOCUMENTS

| | | | |
|---|---|---|---|
| 9,132,900 | B2 | 9/2015 | Salmon et al. |
| 9,135,731 | B2 | 9/2015 | Lauenstein et al. |
| 9,739,884 | B2 | 8/2017 | Proctor et al. |
| 9,784,832 | B2 | 10/2017 | Proctor et al. |
| 9,840,312 | B1 | 12/2017 | Clark |
| 10,012,731 | B2 | 7/2018 | Pelin et al. |
| 10,019,002 | B2 | 7/2018 | Harnett et al. |
| 10,247,832 | B2 | 4/2019 | Serafino et al. |
| 10,365,366 | B2 | 7/2019 | Lauenstein |
| 10,545,235 | B2 | 1/2020 | Pelin et al. |
| 10,914,810 | B2 | 2/2021 | Laster et al. |
| 11,500,054 | B2 | 11/2022 | Clark |
| 11,592,296 | B2 * | 2/2023 | Morita ................. G01C 21/203 |
| 2009/0037040 | A1 | 2/2009 | Salmon et al. |
| 2014/0013270 | A1 | 1/2014 | Thomas et al. |
| 2014/0013276 | A1 | 1/2014 | Butterworth |
| 2014/0071059 | A1 | 3/2014 | Girault |
| 2014/0096060 | A1 | 4/2014 | Thomas et al. |
| 2014/0336854 | A1 | 11/2014 | Salmon et al. |
| 2015/0142211 | A1 | 5/2015 | Shehata et al. |
| 2016/0054733 | A1 | 2/2016 | Hollida et al. |
| 2016/0061951 | A1 | 3/2016 | Brown et al. |
| 2016/0077199 | A1 * | 3/2016 | Nickel .................... G01S 15/93 367/107 |
| 2016/0214715 | A1 | 7/2016 | Meffert |
| 2016/0259049 | A1 | 9/2016 | Proctor et al. |
| 2016/0259050 | A1 | 9/2016 | Proctor et al. |
| 2016/0259051 | A1 | 9/2016 | Proctor et al. |
| 2016/0259052 | A1 | 9/2016 | Kirmani et al. |
| 2016/0306040 | A1 | 10/2016 | Hunt et al. |
| 2016/0341827 | A1 | 11/2016 | Horner et al. |
| 2017/0235308 | A1 | 8/2017 | Gordon et al. |
| 2017/0242113 | A1 | 8/2017 | Lauenstein |
| 2017/0363739 | A1 * | 12/2017 | Lauenstein ............. G01S 15/86 |
| 2018/0100922 | A1 | 4/2018 | Wigh et al. |
| 2018/0107210 | A1 | 4/2018 | Harnett et al. |
| 2018/0288990 | A1 | 10/2018 | Laster et al. |
| 2019/0353744 | A1 * | 11/2019 | Laster ..................... G01S 3/802 |
| 2020/0241133 | A1 * | 7/2020 | Laster ................. G01S 15/8902 |
| 2021/0141048 | A1 | 5/2021 | Laster et al. |
| 2021/0165068 | A1 * | 6/2021 | Clark ..................... G01S 7/521 |

FOREIGN PATENT DOCUMENTS

| | | | |
|---|---|---|---|
| EP | 3572837 | A1 | 11/2019 |
| KR | 20160121915 | A | 10/2016 |
| WO | WO 1997/004334 | A1 | 2/1997 |
| WO | WO 2006/017511 | A2 | 2/2006 |
| WO | WO 2013/126761 | A1 | 8/2013 |
| WO | WO 2014/144471 | A1 | 9/2014 |
| WO | WO 2016/205938 | A1 | 12/2016 |
| WO | WO 2018/201097 | A2 | 11/2018 |

OTHER PUBLICATIONS

"SAMM"; *Oceanic Imaging Consultants*; retrieved Feb. 12, 2021 from https://www.geomatrix.co.uk/software/oceanographic-and-hydrographic/samm/.

WASSP Multibeam; retrieved from <https://wassp.com/video/26/WASSP-S3-Demo-WEB.mp4> May 17, 2018.

Ellison, Ben; Panbo; The Marine Electronics Hub; "Garmin BlueChart g2 & g2 Vision 2010, lots new?" Mar. 16, 2010; retrieved from <https://www.panbo.com/garmin-bluechart-g2-g2-vision-2010-lots-new>.

Ellison, Ben; Panbo; The Marine Electronics Hub; "Maptech i3 fishfinder road trip" Jun. 15, 2005; retrieved from <https://www.panbo.com/maptech-i3-fishfinder-road-trip>.

ADS, Inc.; "SeaBotix—Underwater Remotely Operated Vehicles (ROVs)"; *YouTube*, Jul. 16, 2014; retrieved from https://www.youtube.com/watch?v=hkqJh5j6eQA.

Teledyne Marine; "SmartFlight 2.0 powered by Greensea"; retrieved Jun. 19, 2019 from http://www.teledynemarine.com/smartflight2-0?ProductLineID=112.

"LED Programmable Message Pocket Fan & Rave Toy"; retrieved Jan. 31, 2019 from https://www.amazon.com/LED-Programmable-Message-Pocket-Rave/dp/B002FWOYG2.

AguaDrone—The World's First Drone with a Fish Finder! website visited Oct. 25, 2016 (10 pgs.) https://www.aguadrone.com/.

AeroKontiki—Introducing the world's first autopilot fishing drone kontiki website visited Oct. 25, 2016 (4 pgs.) http://www.aerokontiki.com/.

DIY Drones—The Leading Community for Personal UAVs—Home website visited Oct. 25, 2016 (9 pgs.) www.diydrones.com.

DIY Drones—The Leading Community for Personal UAVs—My Blog Automated Precision Landing on a (stationary) Boat website visited Oct. 25, 2016 (6 pgs.) www.diydrones.com/profiles/blogs/automated-precision-landing-on-a-stationary-boat.

Visual Aerials—Flying Off a Boat—Mark and Romeo's Aerial Adventures website visited Oct. 25, 2016 (3 pgs.) http://www.visual-aerials.com/flying-off-a-boat.html.

Unmanned Marine Systems USV Website visited Oct. 26, 2016 (12 pgs.) http://www.unmannedsystemstechnology.com/company/autonomous-surface-vehicles-ltd/.

* cited by examiner

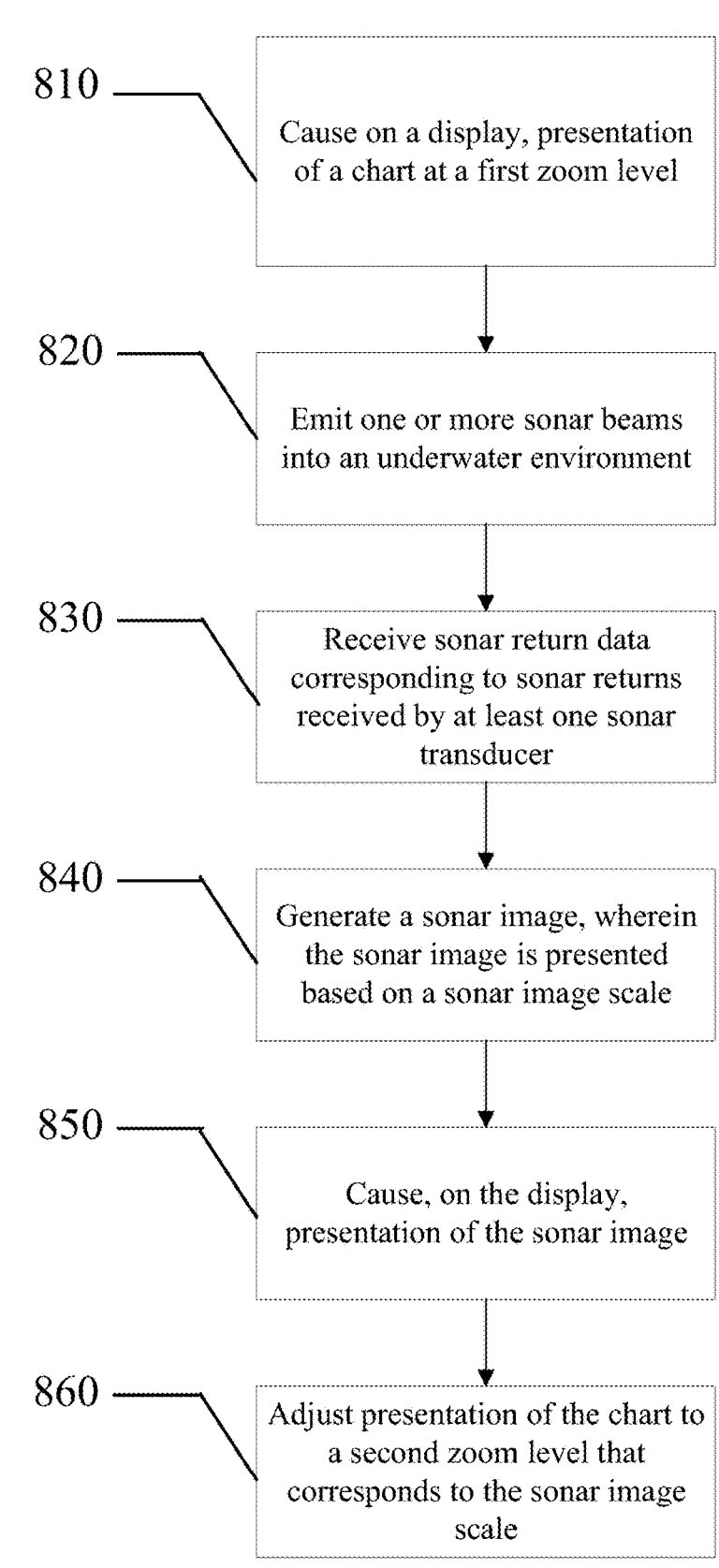

800

810 — Cause on a display, presentation of a chart at a first zoom level

820 — Emit one or more sonar beams into an underwater environment

830 — Receive sonar return data corresponding to sonar returns received by at least one sonar transducer 840 — Generate a sonar image, wherein the sonar image is presented based on a sonar image scale 850 — Cause, on the display, presentation of the sonar image 860 — Adjust presentation of the chart to a second zoom level that corresponds to the sonar image scale

FIG. 9

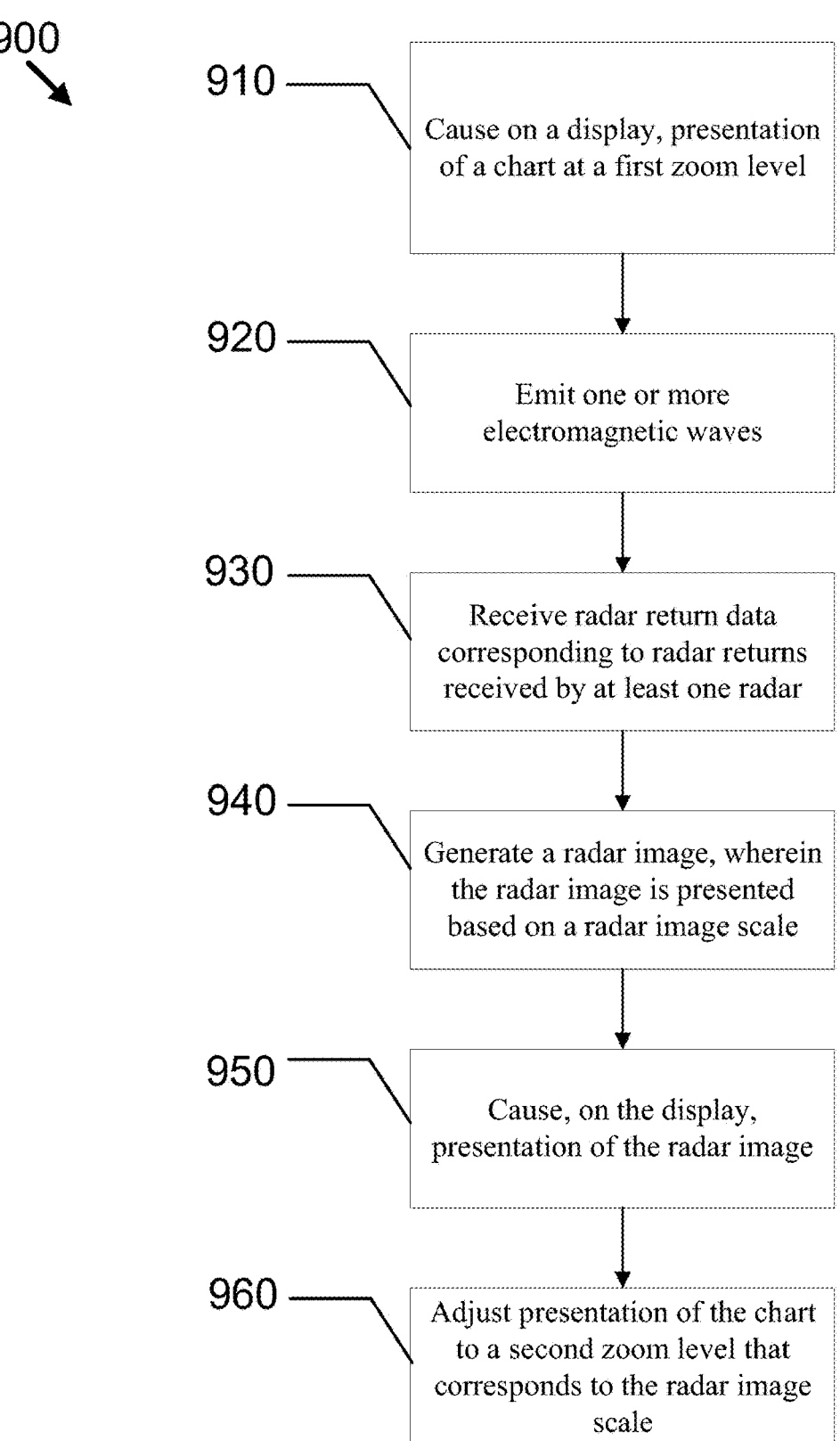

900

910 — Cause on a display, presentation of a chart at a first zoom level

920 — Emit one or more electromagnetic waves

930 — Receive radar return data corresponding to radar returns received by at least one radar 940 — Generate a radar image, wherein the radar image is presented based on a radar image scale 950 — Cause, on the display, presentation of the radar image 960 — Adjust presentation of the chart to a second zoom level that corresponds to the radar image scale

FIG. 10

DYNAMIC CHART ADJUSTMENT USING MARINE DATA

FIELD

Embodiments herein relate generally to presentation of marine data, and more particularly, to providing for improved dynamic adjustments for correlating chart data with other marine data, such as sonar data and radar data.

BACKGROUND

Navigational systems, such as marine navigational systems, may provide for presentation of a navigational chart (e.g., a map). Nautical navigation charts including electronic or interactive nautical charts are typically used to provide a user with information about a body of water including (but not limited to) depth, routes, water temperatures, or the like. Some nautical charts may also provide an indication of the current location of a watercraft (e.g., vessel) associated with a display device presenting the chart. Further, some electronic nautical charts may also display the location, course, speed and/or other information for one or more other watercrafts on the body of water.

Sonar (SOund Navigation And Ranging) has long been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater. Sonar transducer elements, or simply transducers, may convert electrical energy into sound or vibrations at a particular frequency. A sonar sound beam is transmitted into and through the water and is reflected from objects it encounters (e.g., fish, structure, bottom surface of the water, etc.). The transducer may receive the reflected sound (the "sonar returns") and convert the sound energy into electrical energy. Based on the known speed of sound, it is possible to determine the distance to and/or location of the waterborne or underwater objects. The sonar return signals can also be processed to be presented on a display, giving the user a "picture" or image of the underwater environment.

Radar (RAdio Detection And Ranging) uses radio waves to determine the distance, angle, and radial velocity of objects relative to the watercraft. A radar system typically includes an antenna, a transmitter that emits electromagnetic waves corresponding to radar signals, a receiver for receiving radar return signals (the radar signals that reflect off objects and return to the antenna), and a processor to process the radar return signals. The processed radar return signals can be formed into radar image data that is presented on a display device of the watercraft, often as an image type known as plan position indicator (PPI).

Marine electronic devices used on watercrafts during marine activities may present such marine data, for example, within a chart and/or in a separate image, such as near the chart on the screen. The marine data, including the chart data, may be presented to different scales and/or zoom levels, which may complicate use of the marine data images and/or transitioning between the marine data imagery. Such differences in scale and/or zoom level can also cause issues when overlaying one of the marine data images over another. Thus, there exists a need to correlate the marine data for easy viewing and interpretation.

BRIEF SUMMARY OF THE INVENTION

As noted above, it can be difficult to determine a relationship between various types of marine data, such as navigational data, sonar data, and radar data, when presented on marine electronics devices. Each of these data sets may be presented at different scales, zoom levels, orientations, etc. Accordingly, it may be difficult to compile, correlate, and/or overlay one type of data relative to another. In some instances, the mismatch between the zoom level and/or scales for the presentation of each type of marine data may cause one or more of the marine data imagery to be difficult to interpret. For example, sonar imagery may be presented at a scale that does not match well with the zoom level or other features of the currently presented chart. This may make it difficult for a user to interpret the sonar data relative to the presented chart. As another example, sonar imagery overlaid on the chart may be difficult to discern at the chart's current zoom level and may appear as a black line across the chart-which may confuse a user. Moreover, it may be undesirable or difficult for a user to adjust the zoom level or other features of the chart properly and/or when trying to be performed in conjunction with other marine activities (e.g., during fishing, while driving the watercraft, etc.).

Some embodiments of the present invention are directed towards a system for presenting marine data which correlates navigational chart data to other marine data, such as sonar data and/or radar data. As an example, the system presents a navigational chart on the display at a first zoom level. The system receives sonar data from one or more sonar transducers and converts the sonar data into a sonar image at a sonar image scale. The system automatically or in response to a triggering event, adjusts the presentation of the navigational chart to a second zoom level that corresponds to the sonar image scale-thereby correlating the two data sets to be easy to interpret. Other types of correlation are also contemplated herein, such as adjusting a heading extension line to a proper scale, adjusting a radar image zoom level, automatically causing other types of image display and/or adjustment of other display features, among other things.

In an example embodiment, a system for presenting marine data is provided. The system comprises at least one sonar transducer associated with a watercraft, wherein the at least one sonar transducer is configured to emit one or more sonar beams into an underwater environment of a body of water in a direction relative to the watercraft. The system further includes a display; one or more processors; and memory including computer program code configured to, when executed, cause the one or more processors to: cause, on the display, presentation of a chart including a representation of at least a portion of the body of water, wherein the chart is presented at a first zoom level; cause the one or more sonar transducers to emit the one or more sonar beams into the underwater environment; receive sonar return data corresponding to sonar returns received by the at least one sonar transducer; generate a sonar image corresponding to the sonar return data, wherein the sonar image is presented based on a sonar image scale; cause on the display, presentation of the sonar image; and adjust, automatically or in response to a triggering event, presentation of the chart to a second zoom level that corresponds to the sonar image scale, wherein the second zoom level is different than the first zoom level.

In some embodiments, the computer program code is further configured to, when executed, cause the one or more processors to: determine a distance corresponding to a maximum presented sonar range within the sonar image scale; and cause presentation of at least one of the sonar image on the chart relative to a representation of the watercraft on the chart or a representation of the distance corresponding to the maximum presented sonar range relative to the representation of the watercraft on the chart. Adjusting presentation of the chart to the second zoom level comprises adjusting presentation of the chart to the second zoom level such that a length of the sonar image extending from the representation of the watercraft or a length of the representation of the distance extending from the representation of the watercraft covers at least 25% of a length of the chart.

In some embodiments, the computer program code is further configured to, when executed, cause the one or more processors to: receive input from a user adjusting the sonar image scale; and adjust, automatically, presentation of the chart to a third zoom level that corresponds to the adjusted sonar image scale.

In some embodiments, the computer program code is further configured to, when executed, cause the one or more processors to: determine a distance corresponding to a presented sonar range within the sonar image; and cause, on the display, presentation of an extension line, wherein the extension line defines a length. The length of the extension line corresponds to the distance of the presented sonar range. In some embodiments, the computer program code is further configured to, when executed, cause the one or more processors to: determine an orientation of the at least one sonar transducer in the direction relative to the watercraft; and cause, on the display, presentation of the extension line in the direction of the at least one sonar transducer. In some embodiments, the computer program code is further configured to, when executed, cause the one or more processors to: cause, on the display, presentation of one or more scale lines on the presentation of the sonar image; and cause, on the display, presentation of one or more scale lines on the extension line. In some embodiments, the computer program code is further configured to, when executed, cause the one or more processors to: detect a location of an object within the sonar image; and cause, on the display, an indication of the object about the extension line corresponding to the location of the object detected within the sonar image.

In some embodiments, the presentation of the sonar image is adjacent the presentation of the chart.

In some embodiments, the presentation of the sonar image is overlaid onto the presentation of the chart.

In another example embodiment, a system for presenting marine data is provided. The system comprises at least one sonar transducer associated with a watercraft, wherein the at least one sonar transducer is configured to emit one or more sonar beams into an underwater environment of a body of water in a direction relative to the watercraft. The system further comprises a display; one or more processors; and memory including computer program code configured to, when executed, cause the one or more processors to: cause, on the display, presentation of a chart including a representation of at least a portion of the body of water, wherein the chart is presented at a first zoom level; cause the one or more sonar transducers to emit the one or more sonar beams into the underwater environment; receive sonar return data corresponding to sonar returns received by the at least one sonar transducer; determine a distance of the one or more sonar beams, wherein the distance corresponds to a sonar range; generate a sonar image corresponding to the sonar return data, wherein the sonar image is presented based on a sonar image scale; and adjust, automatically or in response to a triggering event, presentation of the chart to a second zoom level that corresponds to the sonar range, such that the sonar range covers at least 25% of the chart, wherein the second zoom level is different than the first zoom level.

In some embodiments, the computer program code is further configured to, when executed, cause the one or more processors to cause, on the display, presentation of the sonar image on the chart relative to a representation of the watercraft on the chart.

In some embodiments, the computer program code is further configured to, when executed, cause the one or more processors to cause, on the display, presentation of a representation of the sonar range on the chart relative to a representation of the watercraft on the chart. In some embodiments, the computer program code is further configured to, when executed, cause the one or more processors to: determine an orientation of the at least one sonar transducer in the direction relative to the watercraft; and cause, on the display, presentation of the representation of sonar range in the direction of the at least one sonar transducer. In some embodiments, the computer program code is further configured to, when executed, cause the one or more processors to cause on the display, presentation of the sonar image adjacent the presentation of the chart. In some embodiments, the computer program code is further configured to, when executed, cause the one or more processors to: cause, on the display, presentation of one or more scale lines on the presentation of the sonar image, wherein the one or more scale lines indicate the sonar image scale; and cause, on the display, presentation of one or more scale lines on the representation of the sonar range presented on the chart.

In yet another example embodiment, a system for presenting marine data is provided. The system comprises at least one sonar transducer associated with a watercraft, wherein the at least one sonar transducer is configured to emit one or more sonar beams into an underwater environment of a body of water in a direction relative to the watercraft. The system comprises a display; one or more processors; and memory including computer program code configured to, when executed, cause the one or more processors to: cause, on the display, presentation of a chart including a representation of at least a portion of the body of water, wherein the chart is presented at a chart scale; cause the one or more sonar transducers to emit the one or more sonar beams into the underwater environment; receive sonar return data corresponding to sonar returns received by the at least one sonar transducer; generate a sonar image corresponding to the sonar return data, wherein the sonar image comprise a sonar image scale; cause on the display, presentation of the sonar image adjacent the chart; and adjust, automatically or in response to a triggering event, presentation of the chart to a second chart scale, wherein the second chart scale is different than the first chart scale.

In some embodiments, the computer program code is further configured to, when executed, cause the one or more processors to: determine a distance corresponding to a maximum presented sonar range within the sonar image scale; and cause presentation of at least one of the sonar image on the chart relative to a representation of the watercraft on the chart or a representation of the distance corresponding to the maximum presented sonar range relative to the representation of the watercraft on the chart. Adjusting presentation of the chart to the second chart scale comprises adjusting presentation of the chart to the second chart scale such that a length of the sonar image extending from the representation of the watercraft or a length of the representation of the distance extending from the representation of the watercraft covers at least 25% of a length of the chart.

In some embodiments, the computer program code is further configured to, when executed, cause the one or more processors to: receive input from a user adjusting the sonar image scale; and adjust, automatically, the chart scale to correspond to the adjusted sonar image scale.

In yet another example embodiment, a system for presenting marine data is provided. The system comprises at least one sonar transducer associated with a watercraft, wherein the at least one sonar transducer is configured to emit one or more sonar beams into an underwater environment of a body of water in a direction relative to the watercraft. The system further comprises a display; one or more processors; and memory including computer program code configured to, when executed, cause the one or more processors to: cause, on the display, presentation of a chart including a representation of at least a portion of the body of water, wherein the chart is presented at a first zoom level; cause, on the display, presentation of a heading line relative to a representation of the watercraft, wherein the heading line comprises scale lines corresponding to the first zoom level; cause the one or more sonar transducers to emit the one or more sonar beams into the underwater environment; receive sonar return data corresponding to sonar returns received by the at least one sonar transducer; determine a distance of the one or more sonar beams, wherein the distance corresponds to a sonar range; generate a sonar image corresponding to the sonar return data, wherein the sonar image is presented based on a sonar image scale; cause, on the display, presentation of the sonar image; and adjust, automatically or in response to a triggering event, presentation of the scale lines to a second zoom level such that the second zoom level corresponds to the sonar image scale.

In some embodiments, the computer program code is further configured to, when executed, cause the one or more processors to adjust the presentation of the chart to the second zoom level such that the heading line extending from the representation of the watercraft covers at least 25% of a length of the chart.

In yet another example embodiment, a system for presenting marine data is provided. The system comprises at least one radar associated with a watercraft, wherein the at least one radar is configured to emit one or more electromagnetic waves in a direction relative to the watercraft. The system further includes a display; one or more processors; and memory including computer program code configured to, when executed, cause the one or more processors to: cause, on the display, presentation of a chart including a representation of at least a portion of the body of water, wherein the chart is presented at a first zoom level; cause the at least one radar to emit the one or more electromagnetic waves; receive radar return data corresponding to radar returns received by the at least one radar; generate a radar image corresponding to the radar return data, wherein the radar image is presented based on a radar image scale; cause on the display, presentation of the radar image; and adjust, automatically or in response to a triggering event, presentation of the chart to a second zoom level that corresponds to the radar image scale, wherein the second zoom level is different than the first zoom level.

BRIEF DESCRIPTION OF THE DRAWINGS

Reference will now be made to the accompanying drawings, which are not necessarily drawn to scale, and wherein:

FIG. 9 illustrates a flowchart of an example method for dynamically adjusting the presentation of a navigational chart to correspond to a sonar image, in accordance with some embodiments discussed herein; and FIG. 10 illustrates a flowchart of an example method for dynamically adjusting the presentation of a navigational chart to correspond to a radar image, in accordance with some embodiments discussed herein.

DETAILED DESCRIPTION

Figure 1:
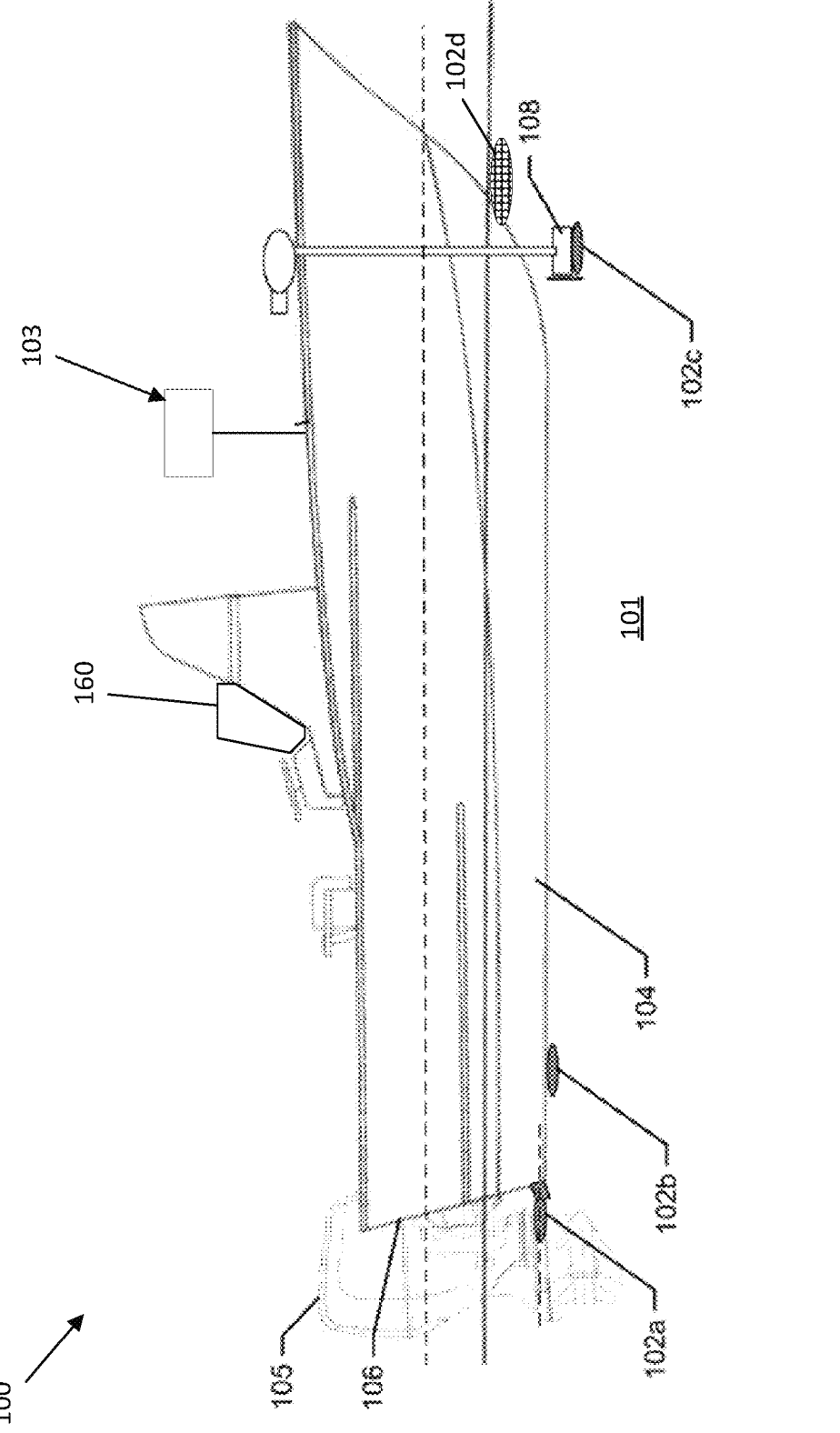
FIG. 1 illustrates an example watercraft illustrating different marine components associated with the watercraft, in accordance with some embodiments discussed herein.

Example embodiments of the present invention now will be described more fully hereinafter with reference to the accompanying drawings, in which some, but not all embodiments of the invention are shown. Indeed, the invention may be embodied in many different forms and should not be construed as limited to the example embodiments set forth herein; rather, these embodiments are provided so that this disclosure will satisfy applicable legal requirements. Like reference numerals refer to like elements throughout.

FIG. 1 illustrates an example watercraft 100 including various marine devices, in accordance with some embodiments discussed herein. As depicted in FIG. 1, the watercraft 100 is configured to traverse a marine environment, e.g., a body of water 101, and may use one or more sonar transducers 102*a*, 102*b*, 102*c*, 102*d*, and one or more radar 103 disposed on and/or proximate to the watercraft. Notably, example watercrafts contemplated herein may be surface watercrafts, submersible watercrafts, or any other implementation known to those skilled in the art.

The sonar transducers 102*a*, 102*b*, 102*c*, 102*d* may each include one or more transducer elements configured to emit one or more sonar beams into an underwater environment of a body of water 101 in a direction relative to the watercraft 100, receive sonar returns from one or more echoes of the one or more sonar beams emitted, and convert the sonar returns into sonar return data. Various types of sonar transducers may be utilized—for example, a linear downscan sonar transducer, a conical downscan sonar transducer, a sonar transducer array, an assembly with multiple transducer arrays, live sonar scan, forward facing sonar transducer, or a sidescan sonar transducer may be used.

The one or more radar 103 of the watercraft may be each include one or more radar elements configured to emit one or more electromagnetic waves about the watercraft 100, receive radar return signals from one or more echoes of the electromagnetic waves emitted, and covert the radar return signals into radar return data. Various types of radar may be utilized.

Depending on the configuration, the watercraft 100 may include a primary motor 105, which may be a main propulsion motor such as an outboard or inboard motor, which may be attached to, for example, a transom 106 of the watercraft 100. Additionally, the watercraft 100 may include a trolling motor 108 configured to propel the watercraft 100 or maintain a position. The one or more sonar transducers (e.g., 102*a*, 102*b*, 102*c*. 102*d*) may be mounted in various positions and to various portions of the watercraft 100 and/or equipment associated with the watercraft 100. For example, the sonar transducer may be mounted to the transom of the watercraft 100 such as depicted by sonar transducer 102*a*. In some embodiments, the sonar transducer may be mounted to the bottom or side of the hull 104 of the watercraft 100, such as depicted by sonar transducer 102*b*. In some embodiments, the sonar transducer may be mounted to the trolling motor 108 such as depicted by sonar transducer 102*c*. In some embodiments, the sonar transducer may be mounted on the bow of the watercraft 100, as depicted by sonar transducer 102*d*.

The watercraft 100 may also include one or more marine electronic devices 160, such as may be utilized by a user to interact with, view, or otherwise control various functionality regarding the watercraft, including, for example, nautical charts, various sonar systems, and radar systems described herein. In the illustrated embodiment, the marine electronics device 160 may be positioned proximate the helm (e.g., steering wheel) of the watercraft 100—although other places on the watercraft 100 are contemplated. Likewise, additionally or alternatively, a remote device (such as a user's mobile device) may include functionality of a marine electronics device.

Figure 2A:
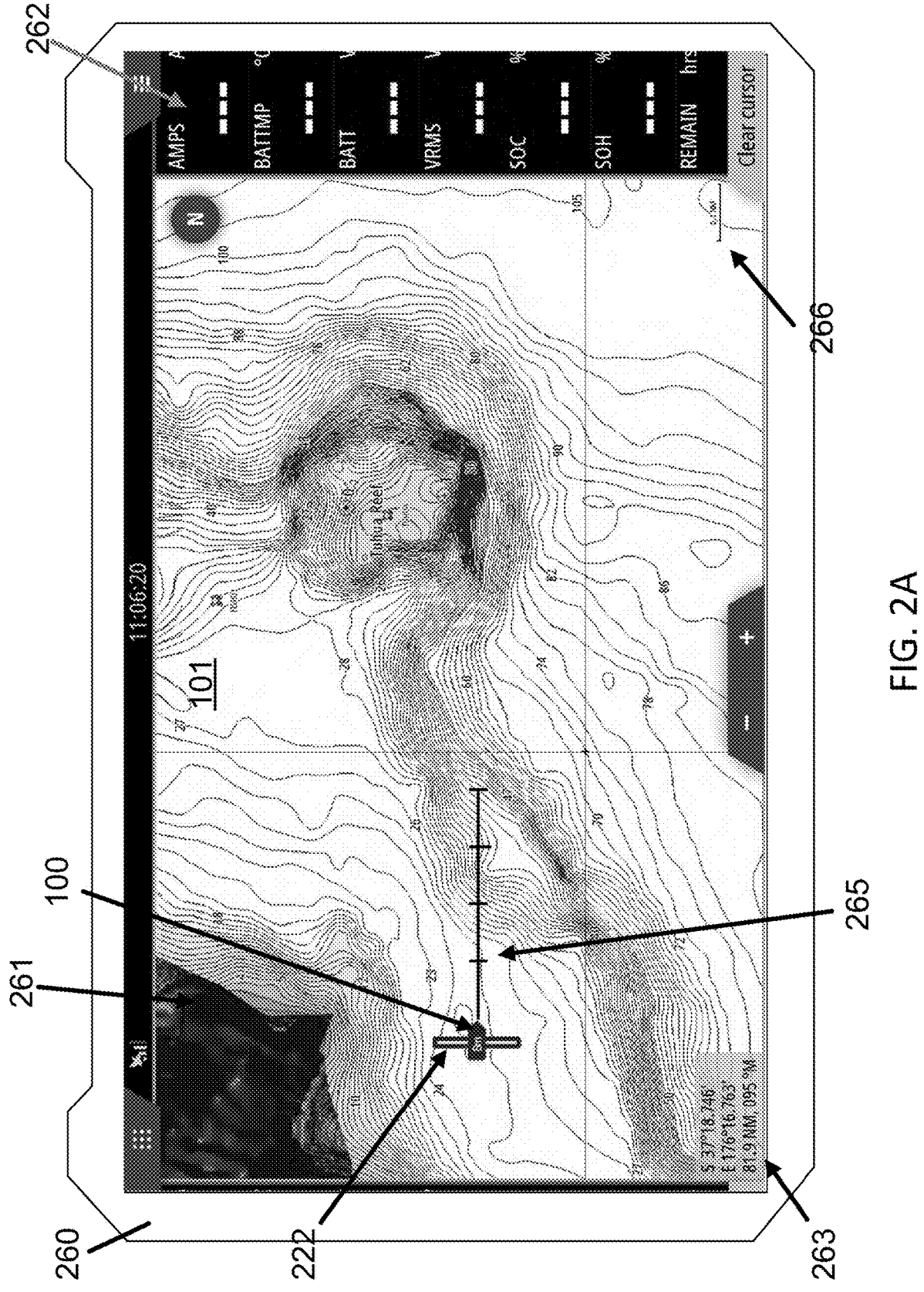
FIG. 2A illustrates an example display presenting a navigational chart, in accordance with some embodiments discussed herein.

FIG. 2A depicts an example marine electronics device 260 presenting a navigational chart 261. The navigational chart 261 depicts an illustration of the watercraft 100 at a current location of the watercraft 100 in the body of water 101. The navigational chart 261 is presented at a first zoom level indicated by a chart scale 266, depicting the relationship between the distance on the chart and the corresponding distance on the Earth's surface. In the illustrated embodiment, the chart scale 261 is set at 0.1 nautical miles. In this regard, in some embodiments, the watercraft 100 may appear not to scale (e.g., the watercraft 100), so that a user may easily interpret the location of the watercraft 100. In some such embodiments, the bow of the watercraft 100, for example, may represent the current location of the watercraft 100 in the body of water 101.

In some embodiments, the presentation of the chart 261 may include an indication of an extension line 265, wherein the extension line 265 extends from the bow of the watercraft 100 so as to illustrate a distance ahead of the watercraft on the chart 261.

In some embodiments, presentation of the chart 261 may additionally include a presentation of a sonar coverage 222. Similar to the presentation of the watercraft 100, in some embodiments the presentation of the sonar coverage 222 may be enlarged to indicate the position, orientation, or type of sonar. In this regard, in the illustrated embodiment, the sonar coverage 222 is indicated to be sonar coverage for a sidescan transducer system. In some embodiments, the extension line 265 may be used to indicate a forward-facing sonar, and the orientation of the extension line 265 may indicate the orientation of the sonar transducer.

As discussed, the watercraft may be equipped with one or more types of sonar transducers and/or sonar transducer configurations. Each of the types and/or configurations of sonar transducers generate different sonar images corresponding to the type and/or configuration thereof. FIGS. 2B-E illustrate the marine electronics device 260 presenting various sonar images 240 generating sonar imagery from different types of sonar systems, and configurations.

Figure 2B:
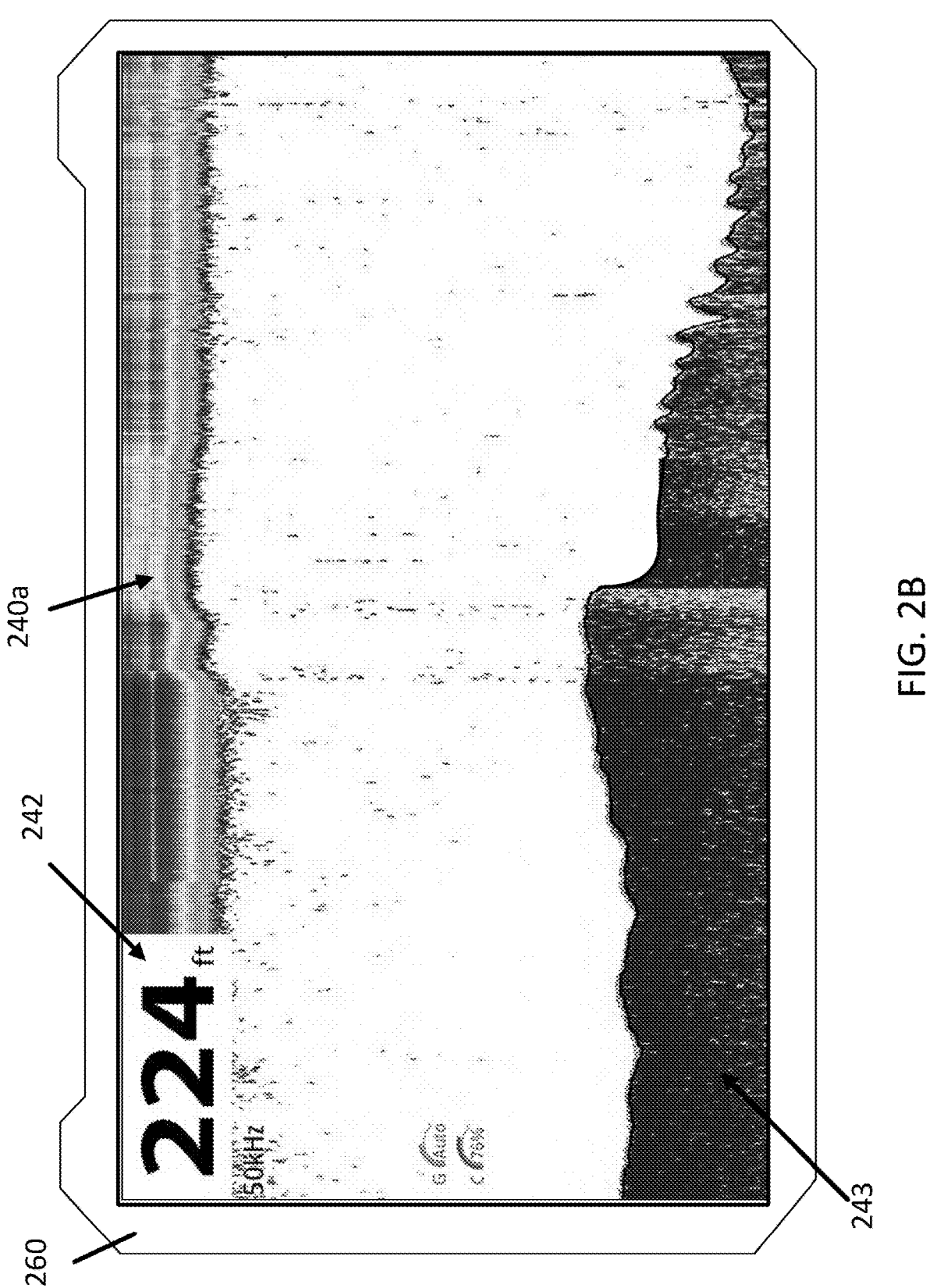
FIGS. 2B-E illustrate an example display presenting sonar images corresponding to various sonar transducer configurations, in accordance with some embodiments discussed herein.

FIG. 2B illustrates the marine electronics device 260 presenting a sonar image 240*a* corresponding to a traditional (e.g., conical) downscan sonar transducer. The sonar image 240*a* illustrates a compilation of sonar return image portions from the sonar transducer, wherein each sonar image portion may be configured as a vertical slice that leads from a zero depth vertically down to a non-zero second depth. In some embodiments, the zero-depth may be the surface of the water, while in other embodiments the zero-depth may be the height of the sonar transducer when the transducer is under the surface of the water. The second non-zero depth may correspond to (and/or include) the bottom surface 243 of the body of water. In some embodiments, the sonar image 240*a* may further include an indication 242 of the depth of the bottom surface of the body of water at the current location.

The sonar transducer may continuously, or incrementally, receive sonar return data, as such, the sonar images presented on the display may continuously update. The system may generate a first subsequent sonar image portion from subsequent sonar return data received at the sonar transducer. The subsequent image portion may be used to update the sonar image portion, by moving the historical sonar image portions left and placing the subsequent sonar image portion adjacent to the most recent sonar image portion that was just moved (e.g., creating a "waterfall" image).

Figure 2C:
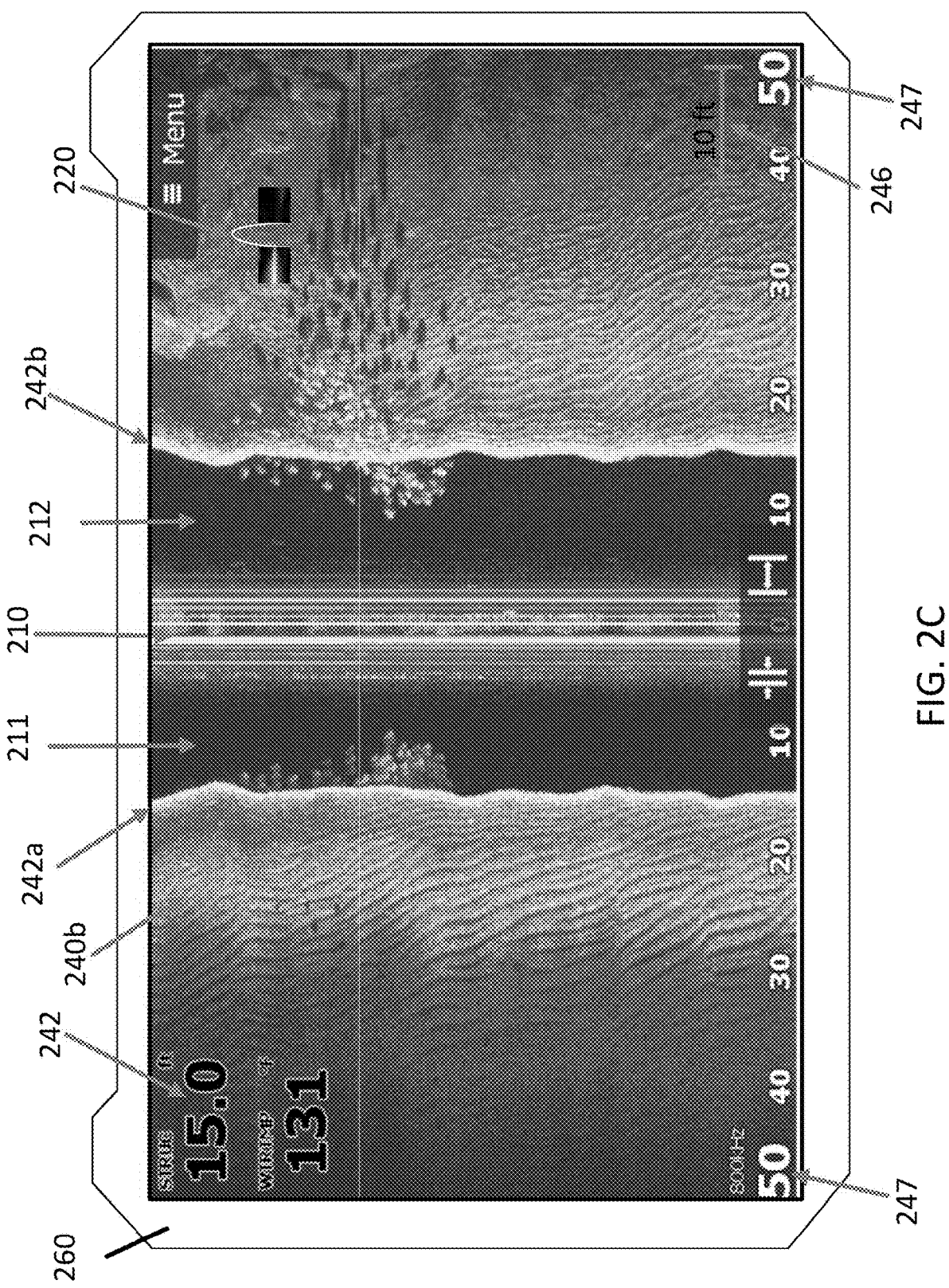

FIG. 2C illustrates the marine electronics device 260 presenting a sidescan sonar image 240b. Sidescan sonar may be utilized to show the bottom surface of the body of water as viewed from the side of the watercraft. The side scan sonar image 240b illustrates a center line 210 indicating the location of the watercraft. A port side water column 211 extends between a port side depth 242a and the center line 210, and a starboard side water column 212 extends between a starboard side depth 242b and the center line 210. In this regard, sidescan sonar image 240b presents a water column extending between the port side depth 242a and the starboard side depth 242b. In some embodiments, the sidescan sonar image 240b may present a depth indication 242, such as to illustrate the depth of the water at the current position of the watercraft. In this regard, the depth presented in the depth indication 242 corresponds to the port side depth 242a and the starboard side depth 242b at the top of the side scan sonar image 240b.

In some embodiments, the sidescan sonar image 240b may be configured to indicate information about the bottom surface of the body of water. For example, different colors on the image may indicate different sediment, or hardness of the bottom surface of the body of water.

The sidescan sonar image 240b may present a heading indication 220 to indicate to the user the direction of travel of the watercraft, and the orientation of the sonar transducers emitting sonar beams into the underwater environment. In sidescan sonar images 240b, a sonar scale 246 may be based on the distance of travel 247 of the sonar beams and/or the desired presentation scale of the received sonar returns (e.g., the user wants to see X feet off to each side). In the presented sidescan sonar image 240b, the distance of travel 247 of the sonar beams emitted from the one or more sonar transducers for presentation of the sidescan sonar image 240b is 50 feet on either side of the watercraft, and the sonar scale 246 is set to 10 feet.

Figure 2D:
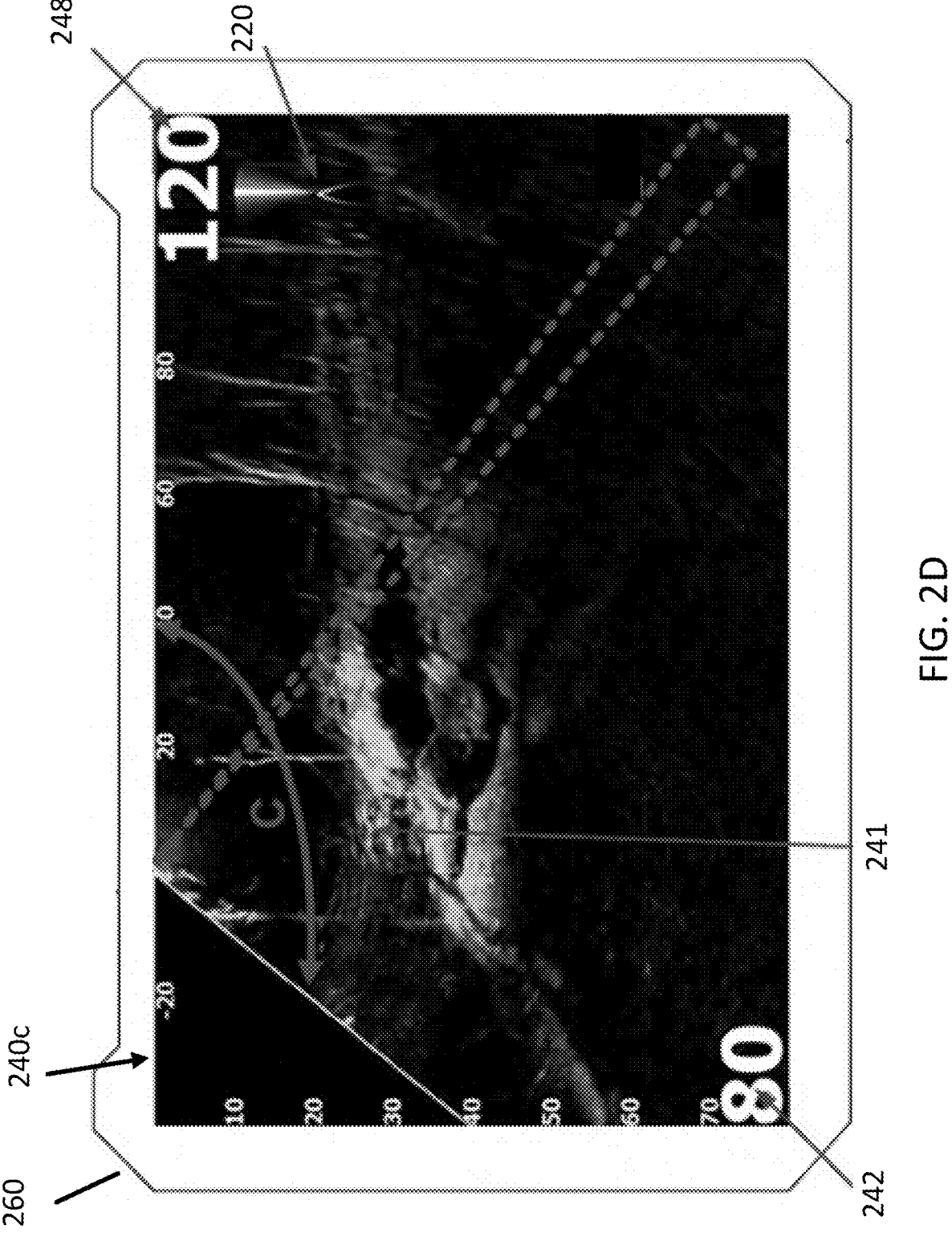

FIG. 2D illustrates a live 2D sonar image 240c presented on the display of the marine electronics device 260. The live 2D sonar image 240c is formed as slices of sonar return data corresponding to each sonar return beam extending within the sonar beam coverage (e.g., along arrow C). In this regard, the live 2D sonar image 240c can be updated in substantially real-time all at once as the sonar returns are all received at substantially the same time (e.g., by selecting different frequencies to form all the different sonar return beams that are used to present sonar return data into the image 240c at the proper angle). The reference distances of the live 2D sonar image 240c may be presented as a straight down distance 242 and a straight outward distance 248. An icon detailing the direction in which the transducer assembly is facing relative to the watercraft is shown at 220. A detailed bottom surface is shown at 241.

Figure 2E:
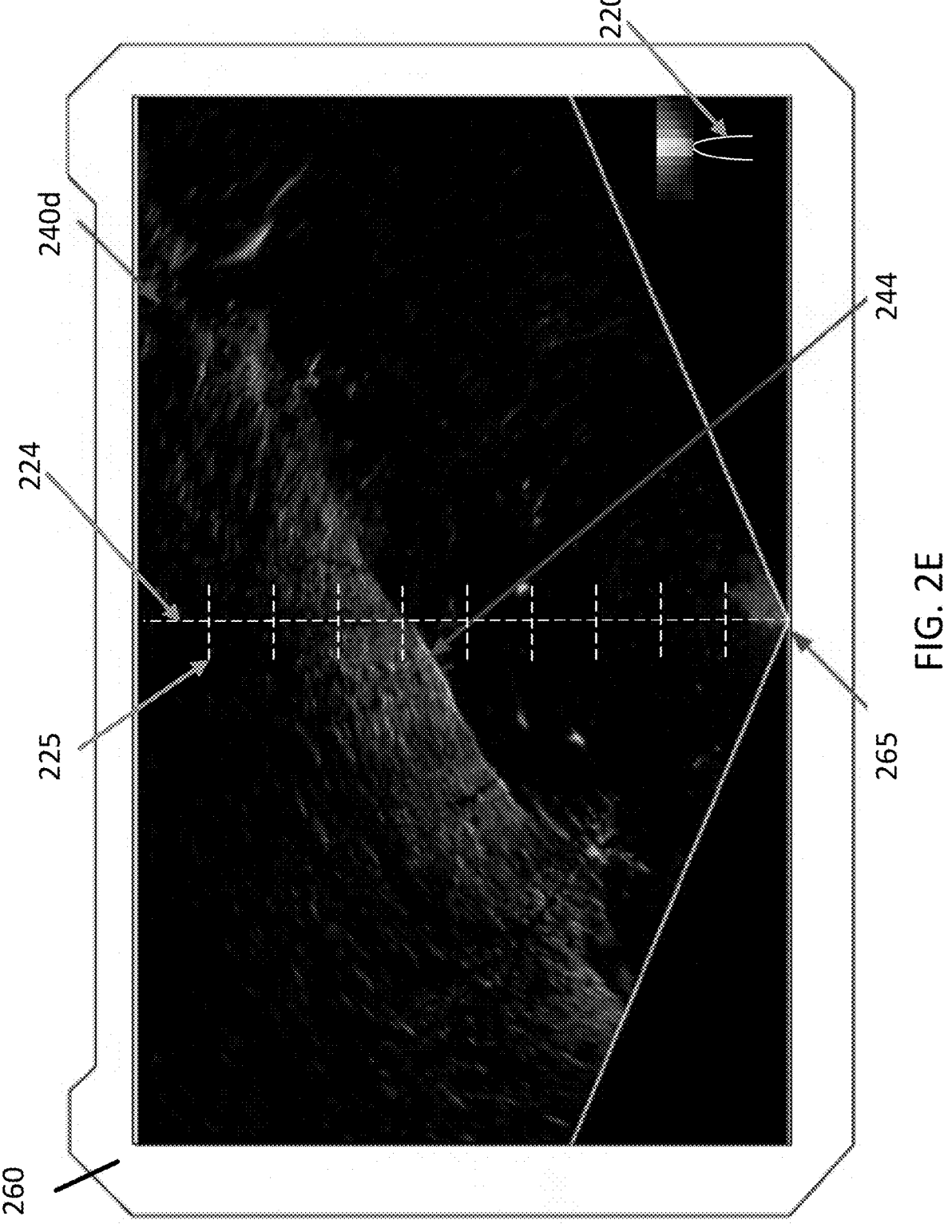

Similarly, a second live sonar image 240d with a horizontal view is presented on the display of the marine electronics device 260 is presented in FIG. 2E. The live 2D sonar image 240d is formed as slices of sonar return data corresponding to each sonar return beam extending within that sonar beam coverage extending from the transducer assembly location. In this regard, the live 2D sonar image

240d can be updated in substantially real time all at once as the sonar returns are all received at substantially the same time (e.g., by selecting different frequencies to form all the different sonar return beams that are used to present sonar return data into the image at the proper angle).

As illustrated in FIG. 2E, a heading line 224 and scale lines 225 may be presented over the sonar image 240d. In some embodiments, the user may determine the desired scale to be presented over the sonar image.

Figure 2F:
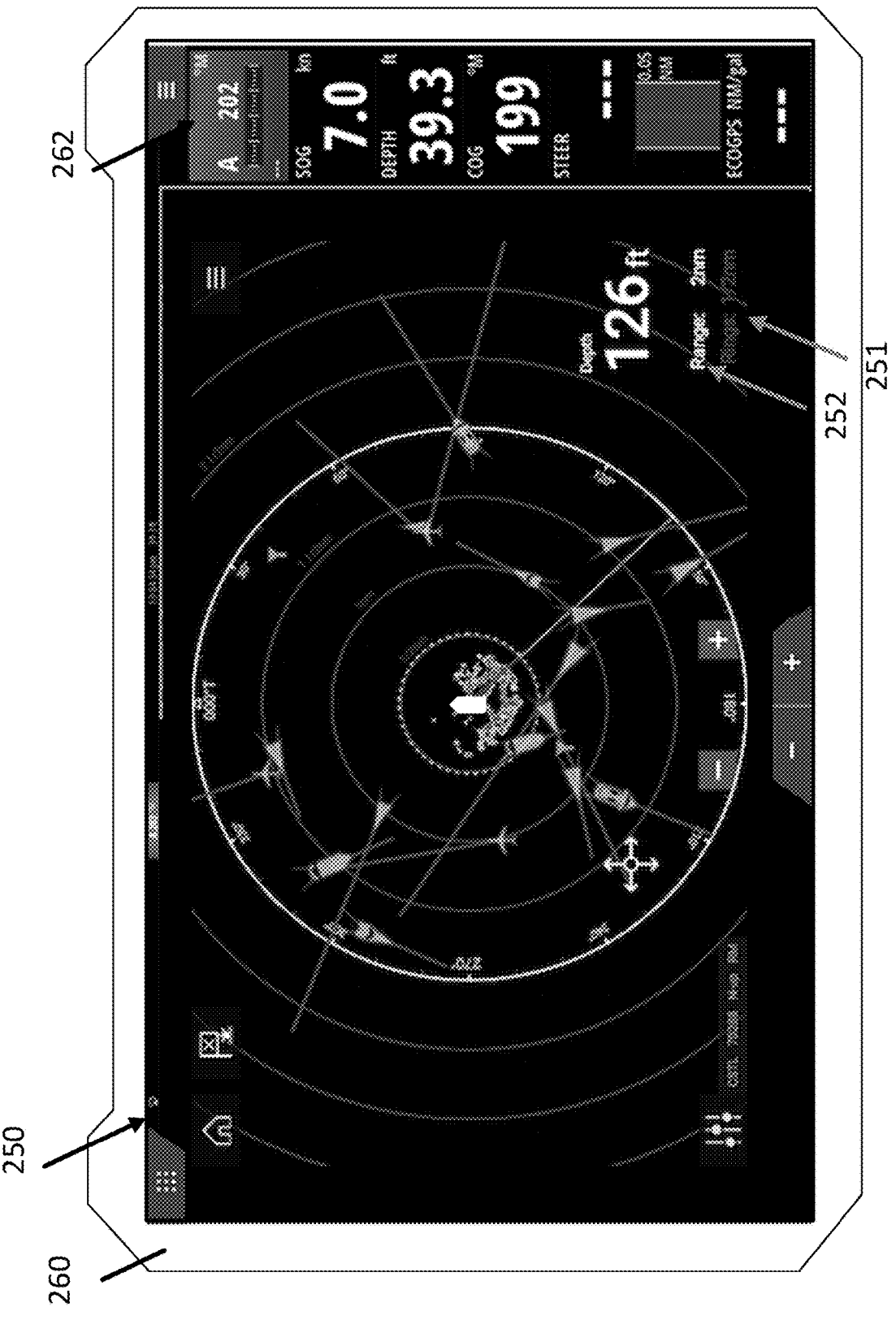
FIG. 2F illustrates an example display presenting a radar image, in accordance with some embodiments discussed herein.

In some embodiments, as illustrated in FIG. 2F, a radar image 250 may be presented on the marine electronics device 260. Similar to the sonar images, the radar image 250 may present a radar range 252 indicated by the edge of the image 250, and a radar range 251 indicated by the radial distance between two adjacent rings.

Each of the sonar images, illustrated in FIGS. 2B-E, and/or the radar image, illustrated in FIG. 2F, may be presented next to and/or overlaid onto a navigational chart, such as the navigational chart illustrated in FIG. 2A. However, the presentation of each of the navigational chart 261 and the sonar images 240a, 240b, 240c, 240d, and the radar image 250 may have different scales, and thus, the resulting split screen view and/or overlay may present a difficult to interpret representation of the marine environment.

Various embodiments of the present invention may adjust automatically or in response to a triggering event the navigational chart scale (e.g., 266 FIG. 2A) and/or the sonar image scale or radar image scale to aid a user in interpretation of the marine data. As discussed herein, the navigational chart scale may be adjusted when the sonar image and the navigational chart are in separate screens, presented in a split screen, and/or when the sonar image is overlaid onto the navigational chart, each of which will be discussed further herein. This is also true for other marine data, such as radar data, as will be apparent to one of ordinary skill in the art in view of this disclosure.

Figure 3A:
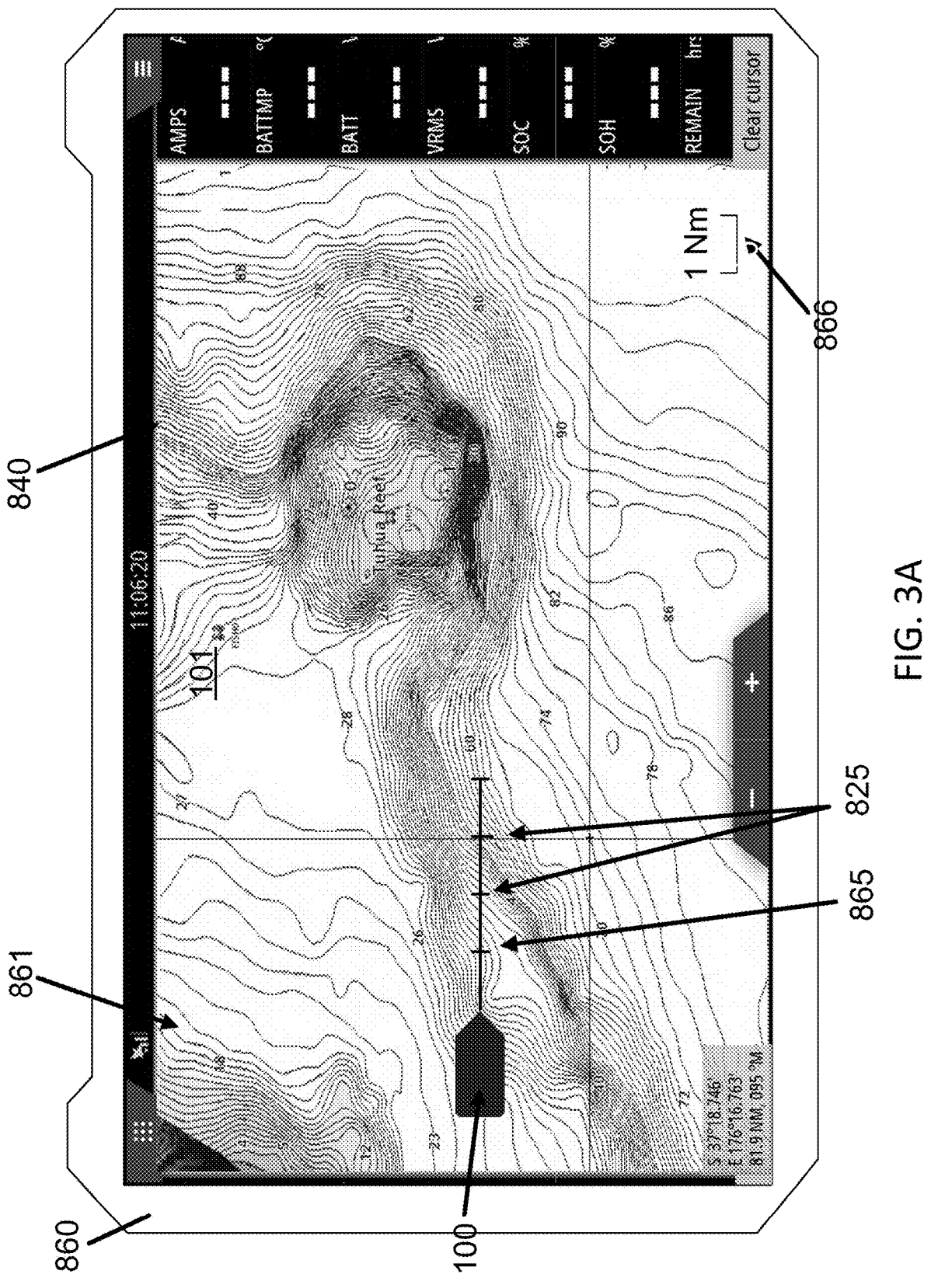
FIG. 3A illustrates an example display presenting a navigational chart at a first zoom level, in accordance with some embodiments discussed herein.
Figure 3B:
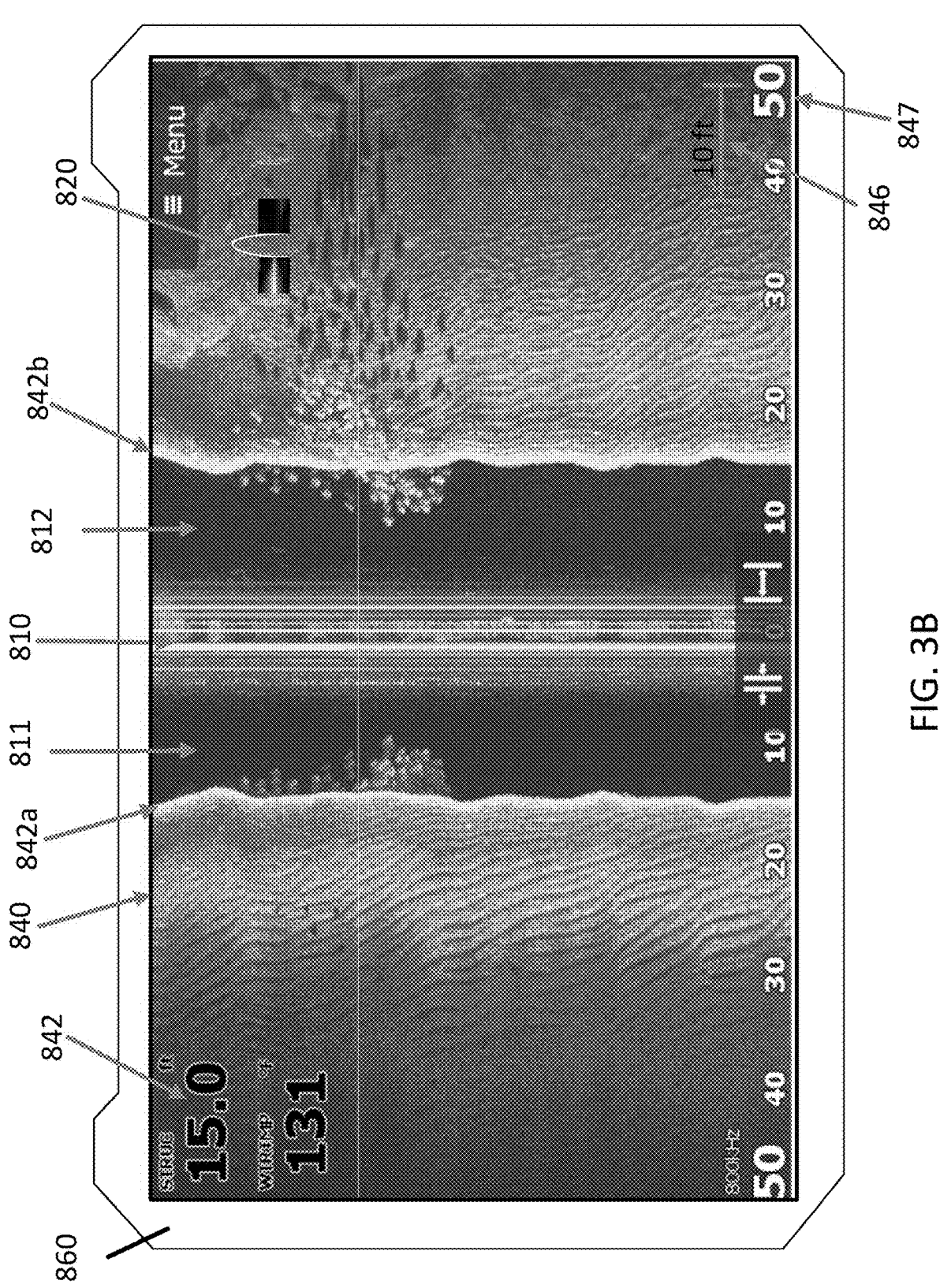
FIG. 3B illustrates an example display presenting a sonar image at a sonar image scale, in accordance with some embodiments discussed herein.
Figure 3C:
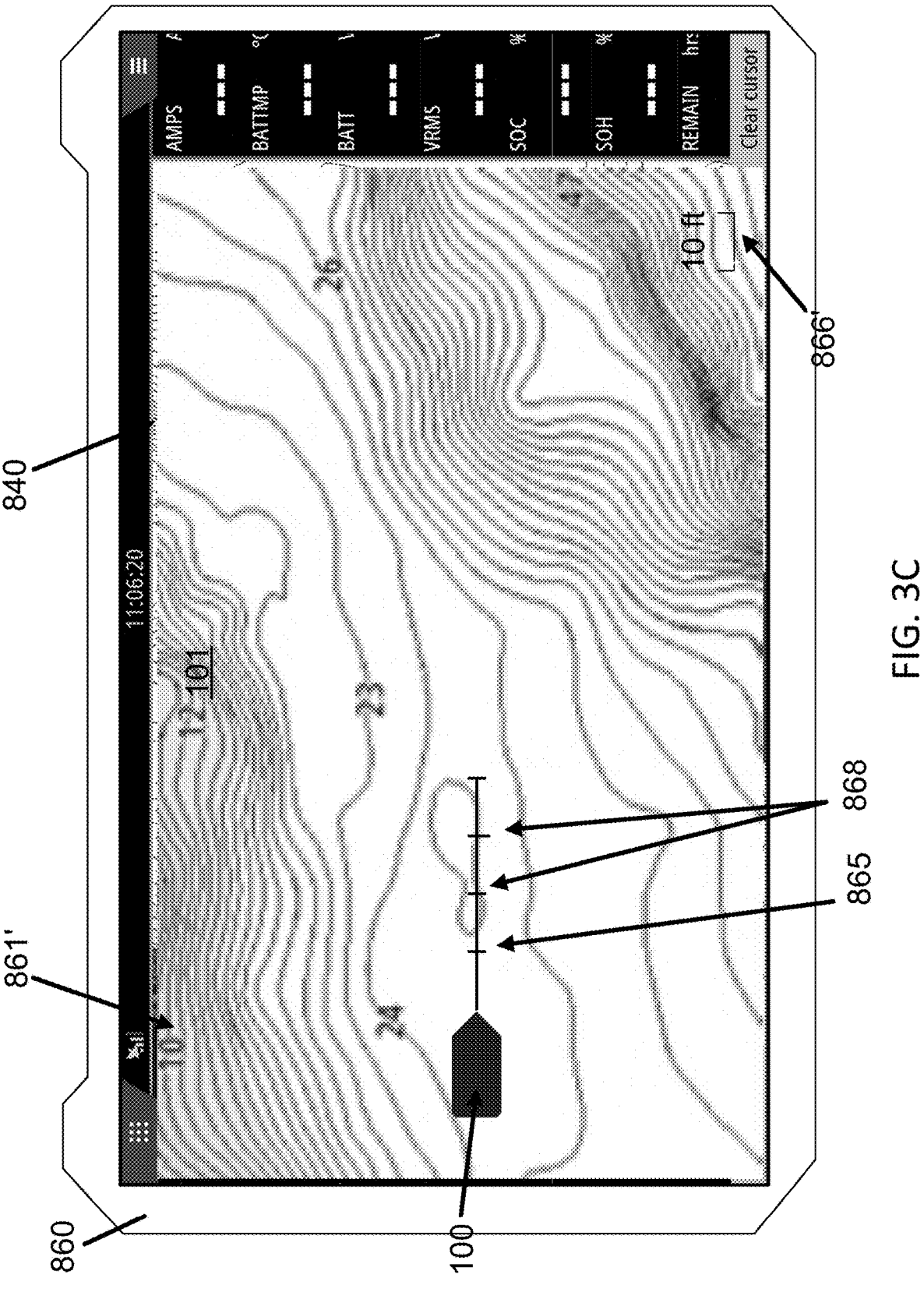
FIG. 3C illustrates the example display presenting the navigational chart, shown in FIG. 3A, at a second zoom level, in accordance with some embodiments discussed herein.

FIGS. 3A-C illustrate an example embodiment of changing the zoom level of the navigational chart such that the chart scale corresponds to the sonar image scale. In this regard, when a user looks between (e.g., in split screen mode) and/or toggles between the sonar image and the navigational chart, the user may more easily correlate the sonar image to the navigational chart and position in the body of water.

FIG. 3A illustrates a navigational chart 861 presented at a first zoom level on the marine electronics device 860. The navigational chart 861 includes a representation of the watercraft 100 at the current location in the body of water 101 and may include a heading line 865 extending therefrom. In some embodiments, the heading line 865 comprises scale lines 825 positioned at intervals corresponding to a chart scale 866. In the illustrated example, the chart scale 866 is set at 1.0 nautical mile and, thus, each of the scale lines 825 indicate one nautical mile ahead of the previous scale line 825. In some embodiments, the watercraft 100 may not be illustrated according to the chart scale 866. To explain, the length of the watercraft 100 depicted in FIG. 3A would be over 1 nautical mile, as the representation of the watercraft 100 is greater than the length of the chart scale 866 indicating 1 nautical mile. In this regard, in some example embodiments, the tip of the watercraft 100 may represent the current location of the watercraft 100.

In some embodiments, the chart scale 866 may adjust as the zoom of the navigational chart 861 is changed. For example, as the navigational chart 861 is zoomed in (e.g., presents less of the body of water 101) distance corresponding to the chart scale 866 may decrease. Similarly, when the navigational chart 861 is zoomed out, the distance corresponding to the chart scale 866 may increase.

As discussed, the watercraft 100 may utilize one or more sonar transducers to detect and depict the underwater environment about the watercraft 100. As illustrated in FIG. 3B, a sonar image 840 may be generated from the sonar returns being received at the one or more sonar transducers. In the illustrated embodiment, the sonar image 840 depicts a sidescan image from a center line 810 of the watercraft. A sonar scale 846 is illustrated over the sonar image 840, in addition to a sonar range 847. In this regard, the sonar range 847 extends 50 feet on either side of the watercraft or about 0.008 nautical miles. Thus, the sonar image 840 and the navigational chart 861 indicate vastly different image scales, which may cause confusion to a user when reviewing each page on the marine electronics device 860. Although it may be easy to understand that a sonar image with a 50 foot range is different than a navigational chart presenting multiple nautical miles of the body of water, many sonar transducers may have adjustable ranges, and navigational charts may be able to be zoomed in and out, which may continuously change the relationship between the two scales (e.g., the chart scale and the sonar scale).

In order to reduce confusion when reviewing marine data, the scales of the navigational chart, the sonar image, and/or the radar image may be adjusted automatically to display the same scale or better corresponding scales. For example, the navigational chart 861 presented at a first zoom level in FIG. 3A, may be automatically adjusted to a second zoom level, illustrated in the navigational chart 861' shown in FIG. 3C. In this regard, when the user toggles between the navigational chart 861' at the second zoom level and the sonar image 840, the chart scale 866' and the sonar image scale 846 are the same (although in some embodiments, the second zoom level may not be the same scale, but may be "closer" in scale so that it is easier for a use to appreciate a direct correlation between the sonar imagery and the navigational chart). Thus, the user is able to look at the sonar image 840, and more specifically the objects presented within the sonar image 840 and determine the position of objects in relation to the watercraft 100 on the navigational chart.

Differences in chart scales may also occur in split screen uses. For example, a user may desire to present a navigational chart and corresponding sonar image adjacent to one another to reference both the location of the watercraft in the body of water and the underwater environment at that navigational position.

Figure 4A:
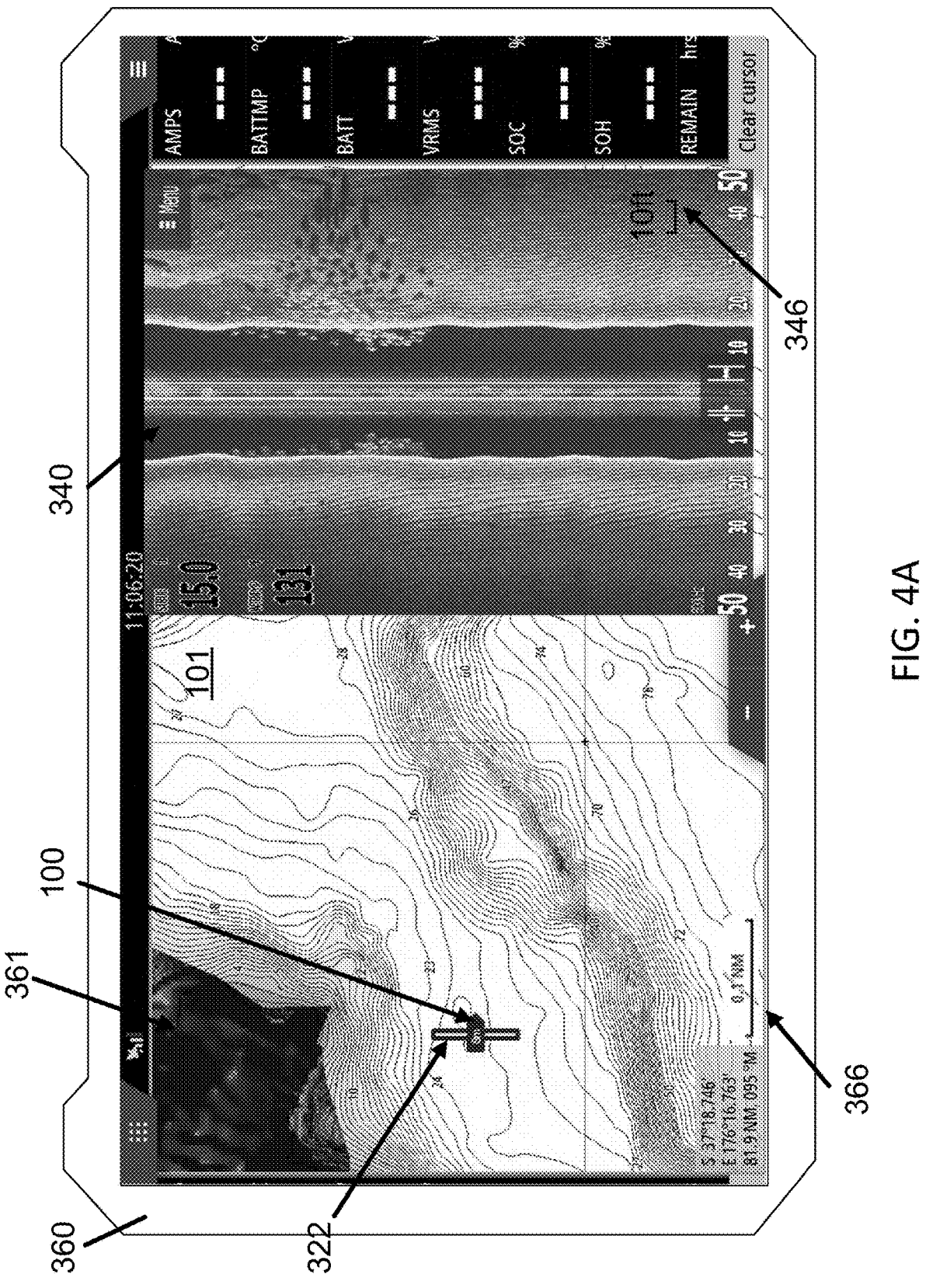
FIG. 4A illustrates an example display presenting a split screen displaying a navigational chart at a first zoom level and a sonar image at a sonar image scale, in accordance with some embodiment discussed herein.
Figure 4B:
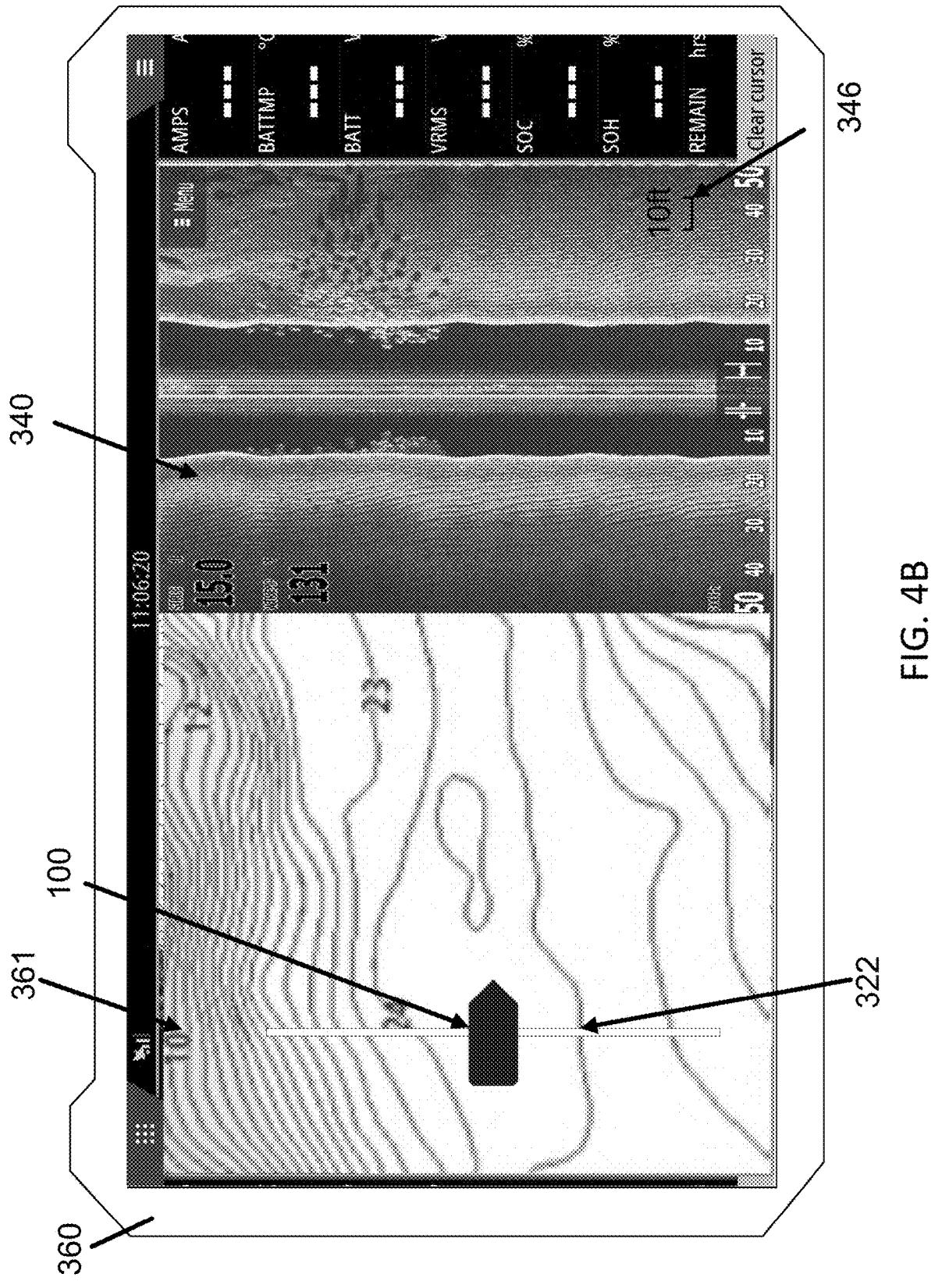
FIG. 4B illustrates the example display presenting the split screen presenting the sonar image at the sonar image scale, and the navigational chart at a second zoom level, in accordance with some embodiments discussed herein.

With reference to FIGS. 4A-B, in some embodiments, the user may utilize a split screen on a marine electronics device 360. The split screen may present a navigational chart 361 on a first side of the marine electronics device 360 and a sonar image 340 on a second side of the marine electronics device 360. In some embodiments, the navigational chart 361 may include an overlay 322 of the sonar coverage. The overlay 322 may indicate the facing direction of the one or more sonar transducers, and thus, may indicate the type of sonar image 340 to be presented on the marine electronics device 360. In this regard, the overlay 322 indicates a sidescan sonar configuration as the overlay 322 extends off of the sides (e.g., port side and starboard side) of the watercraft 100. The sonar image 340 illustrates the underwater environment corresponding to the overlay 322 illustrated in the navigational chart 361.

In some embodiments, the sonar image 340 may include a sonar image scale 346 indicating the sonar image zoom level. In the illustrated embodiment, the sonar image scale

346 indicates a range of 10 feet. In this regard, the sonar image 340 presents an image displaying 50 feet from the center line on either side of the watercraft, for a total of about 100 feet, depicted in the sonar image 340.

In contrast, the navigational chart 361 includes a chart scale 366 indicative of a first zoom level at a chart scale 366 of 0.1 NM. Thus, the overlay 322 on the navigational chart 361 indicates about 0.066 NM which indicates a coverage of about 200 feet on either side of the watercraft 100. In this regard, the two images (the navigational chart 361 and the sonar image 340) depict different zoom levels, which may be confusing to a user who may not be familiar with locating scales (e.g., 366, 346), or who may not be familiar with different units of measurement.

In some embodiments, the marine electronics device 360 may recognize this difference in the zoom levels and may adjust the chart scale 366 zoom level to better correspond to the sonar image scale 346, as illustrated in FIG. 4B. After the adjustment the navigational chart 361 is adjusted to a second zoom level, where the second zoom level is different than the first zoom level. At the second zoom level, the chart scale is equal to the sonar image scale 346, and thus, only one scale indication is presented on the marine electronics device 360. Further, at the second zoom level, the overlay 322 of the sonar image range on the navigational chart 361 reflects the actual range of the sonar transducers. In this regard, if an object is located within the sonar image 340, the object will correspond to that position within the overlay 322 presented on the navigational chart 361. In some embodiments, the zoom adjustments may provide more accurate real time information about where objects detected within the sonar image 340 are relative to the watercraft 100. Notably, however, in some embodiments, the scales of the two images do not need to be the same to accomplish an improved user experience and just may be presented closer to each other. For example, merely increasing the zoom level of the chart may provide benefit to the user and, thus, some embodiments of the present invention merely adjust the zoom level to better correspond to the sonar scale. For example, in some embodiments, the zoom level of the chart 361 may be adjusted such that the overlay 322 may cover a percentage of the screen of the display (e.g., 25% or more of the corresponding direction (e.g., vertical or horizontal), 50% or more, 15% or more, or any other percentage). In such an embodiment, the resulting zoom level of the chart provides a visual coverage area that is easier to interpret for the user (e.g., when sonar is limited to 50 feet from either side, having the chart zoomed out such that 50 feet is a very small percentage of the chart screen (e.g., 5% or less) is not helpful).

As an example scenario, a user may turn on the structure map without noticing—which is where sidescan sonar imagery is overlaid on the chart. However, when the zoom level of the navigational chart is significantly greater than the scale of the sidescan imagery, the details of the sidescan image in the structure map may not be presented, as generally the structure map presents a smaller area in comparison to the navigational chart. In this case, a line or shadow may begin to appear on the navigational chart corresponding to the path of the watercraft.

Figure 5A:
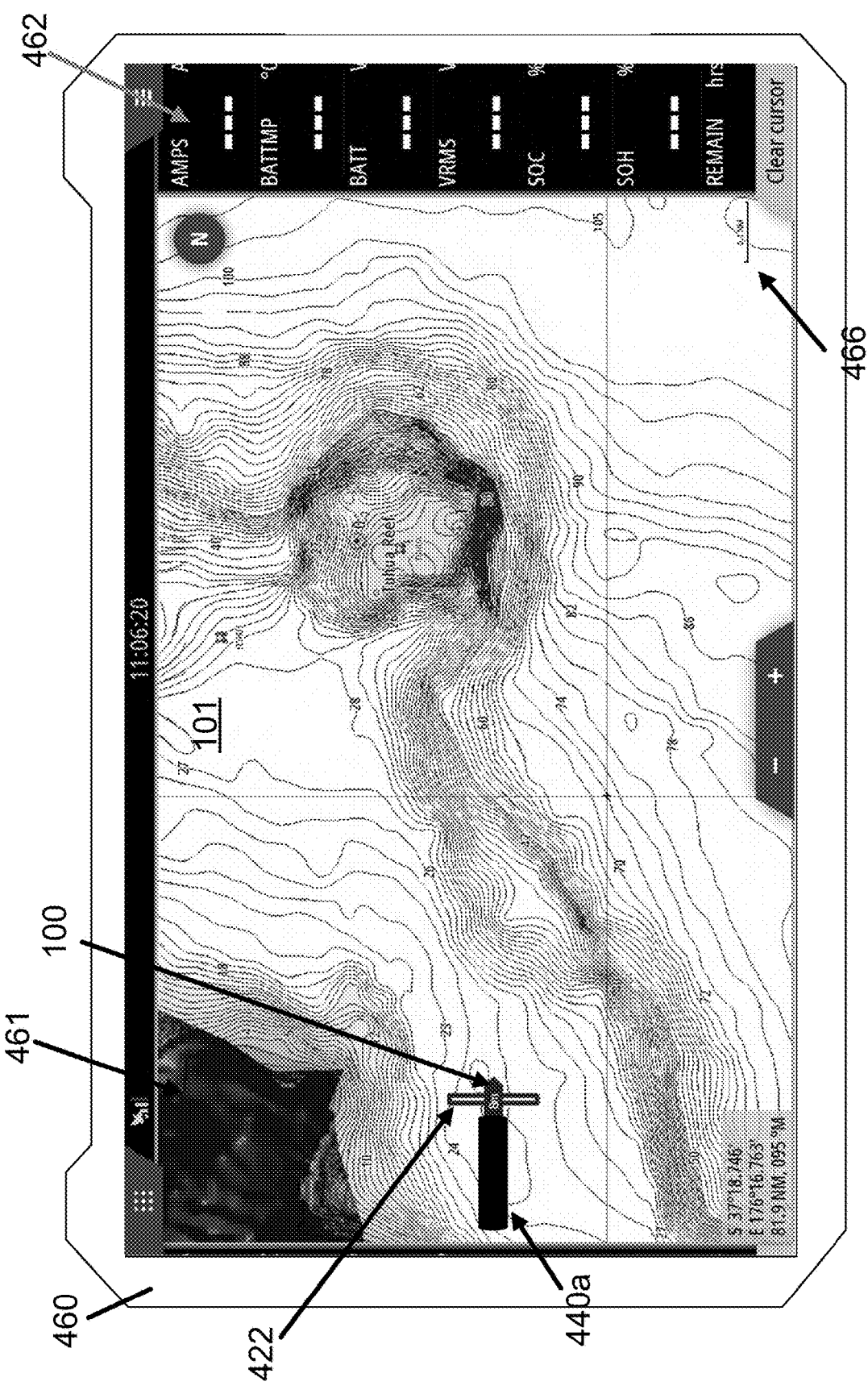
FIG. 5A illustrates an example display presenting a navigational chart at a first zoom level, in accordance with some embodiments discussed herein.
Figure 5B:
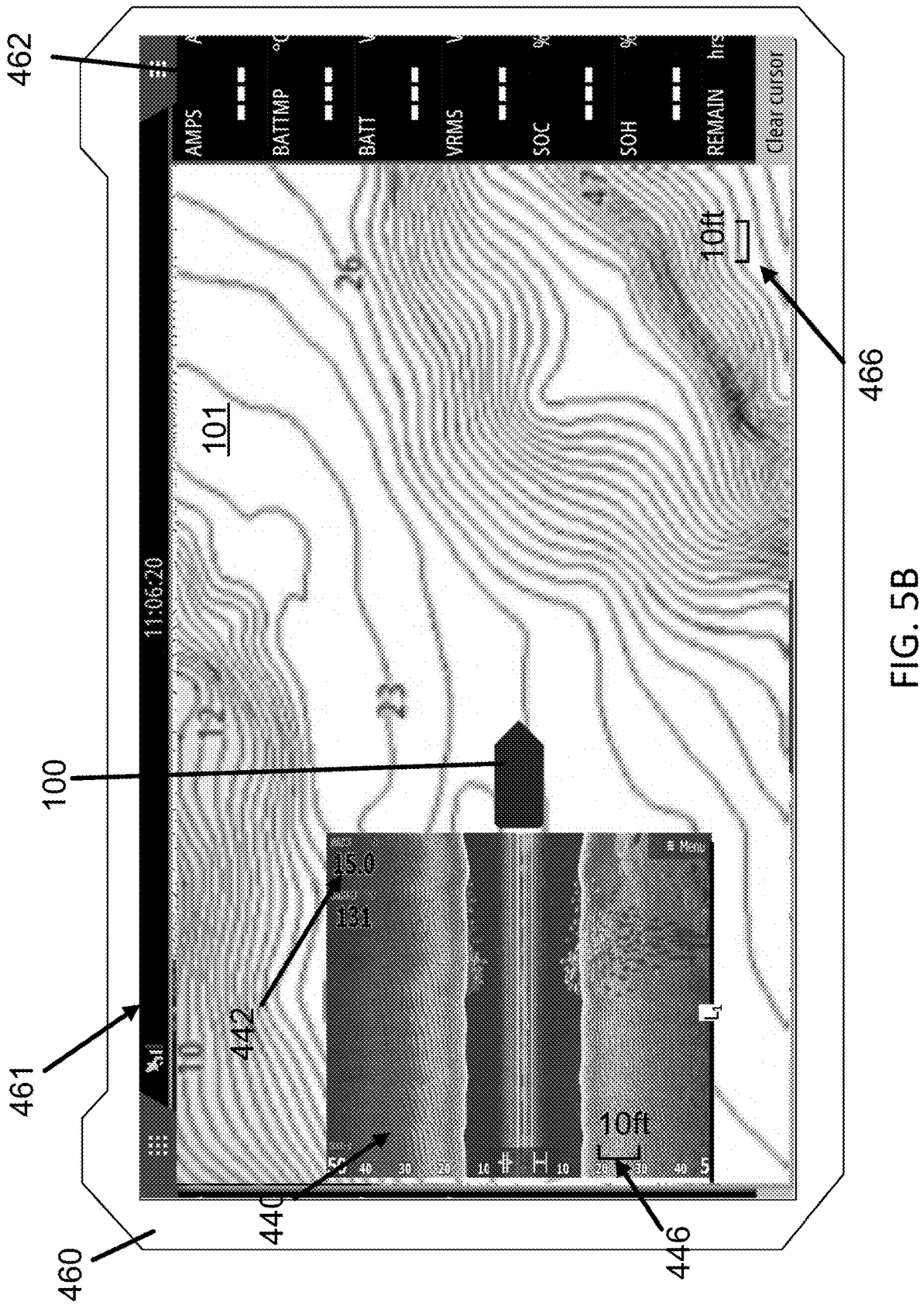
FIG. 5B illustrates the example display presenting the navigational chart, shown in FIG. 5A, at a second zoom level, in accordance with some embodiments discussed herein.

FIGS. 5A-B illustrate the above scenario and a proposed solution according to various embodiments of the present invention. A navigational chart 461 may be presented on a marine electronics device 460. With reference to FIG. 5A, the navigational chart 461 may be presented at a first zoom level thereby defining a chart scale 466. An indication of the watercraft 100 may be presented relative to the location within the body of water 101. In some embodiments, the watercraft 100 may be presented not to scale, so as to be visualized by the user. In this regard the bow of the watercraft 100 may be positioned at the current location of the watercraft 100. As discussed, in some embodiments, the overlay 422 of the sonar transducer coverage may indicate the type of sonar image generated, however, the overlay 422, when presented at a chart scale may misconstrue the coverage of the sonar transducers or be difficult to interpret due to the relatively high zoom level of the chart.

As illustrated in FIG. 5A, a trail 440a may be generated behind the watercraft 100. In some embodiments, the trail 440a may be caused by a user engaging the structure map feature. In some embodiments, the structure map feature may be engaged through a touch button in a menu 462 of the marine electronics device 460. The structure map feature may present an overlay of a sonar image (e.g., 440 FIG. 5B) onto the navigational chart thereby illustrating the underwater environment of the path of travel of the watercraft. However, due to the differences in the sonar scale (e.g., 446 FIG. 5B) and the chart scale 466, the sonar image (e.g., 440 FIG. 5B) may present as black trail 440a on the navigational chart 461.

To prevent the sonar image 440 from appearing as a black trail 440a, the system may detect engagement of the structure map and automatically adjust the chart scale 466 to a second zoom level, such that the second zoom level better corresponds to the sonar image scale 446, as illustrated in FIG. 5B. For example, the chart scale 466 may be adjusted to increase the zoom level of the chart 461 so as to make the sidescan imagery more visible over the chart-providing benefit to the user viewing the chart. For example, in some embodiments, the zoom level of the chart 361 may be adjusted such that the sidescan sonar image 440 may cover a percentage of the screen of the display (e.g., 25% or more of the corresponding direction (e.g., vertical), 50% or more, 15% or more, or any other percentage). In such an embodiment, the resulting zoom level of the chart provides a visual coverage area that is easier to interpret. In some embodiments, the chart scale 466 may be adjust so as to be the same as the sonar image scale 446 to enable the sidescan sonar image 440 to be visibly overlaid on the navigational chart 461 in a visually discernable manner rather than presenting as a black trail (440a FIG. 5A).

As discussed, different types of sonar images may be generated with different orientations and configurations of sonar transducers. Thus, a forward-facing sonar transducer configuration may be used to generate and present a live sonar image. As discussed with reference to FIGS. 2D-E, the live sonar image may update in real time and indicate to a user the location of objects in relation to the watercraft 100.

In some embodiments, they system may determine a distance corresponding to a maximum presented sonar range. As illustrated in FIG. 5B, the sonar range may be 100 feet (e.g., 50 feet on either side of the watercraft 100). The second zoom level of the navigational chart 461 may be adjusted such that a length Li of the sonar image 440 extending from the representation of the watercraft 100 covers a determined amount of the navigational chart 461. In some embodiments, the determined amount may be 10% of the chart, 25% of the chart, or even 50% of the navigational chart 461.

Figure 6A:
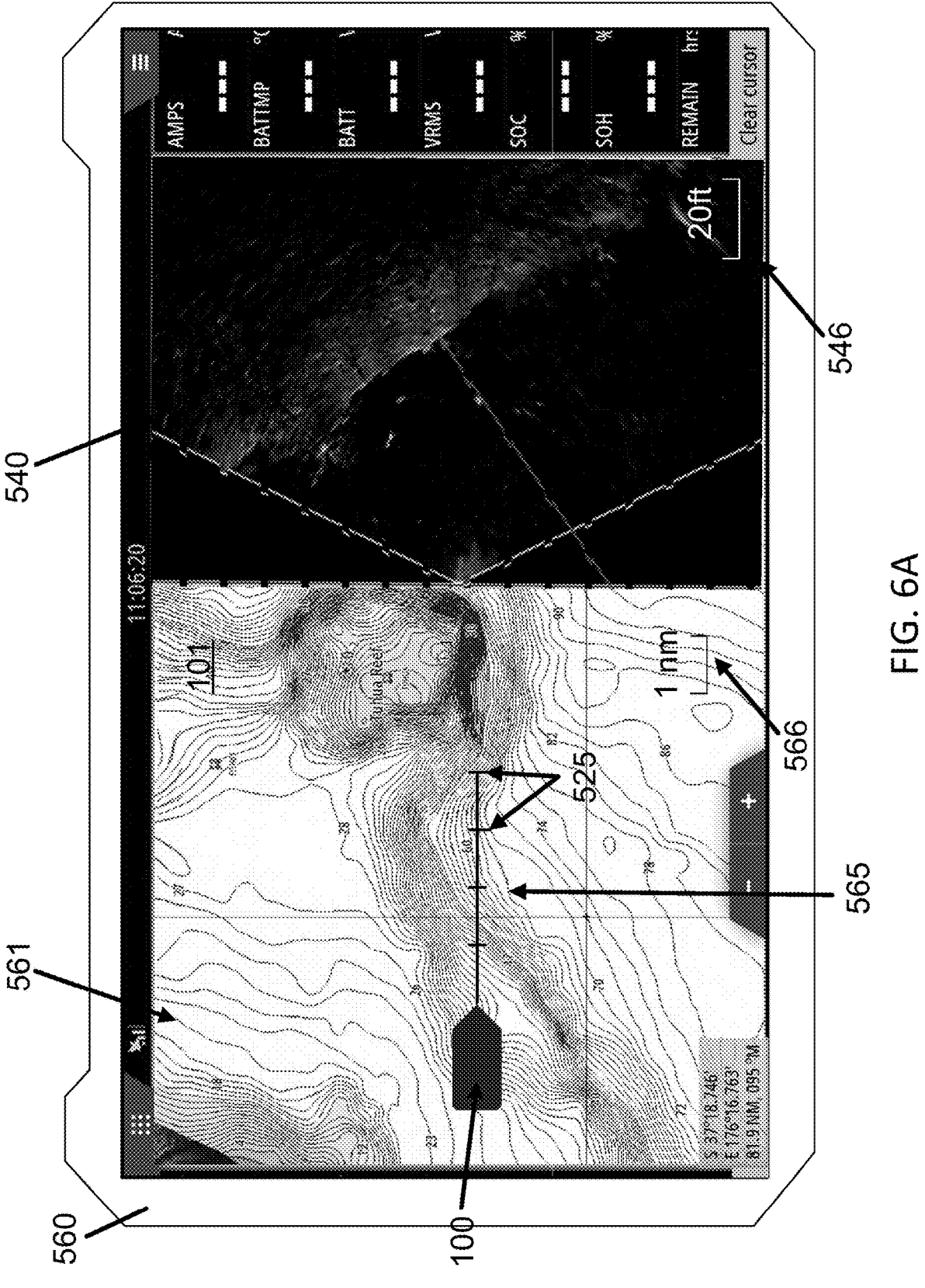
FIG. 6A illustrates an example display presenting a split screen presenting a navigational chart at a first zoom level and a sonar image at a sonar image scale, in accordance with some embodiments discussed herein.
Figure 6B:
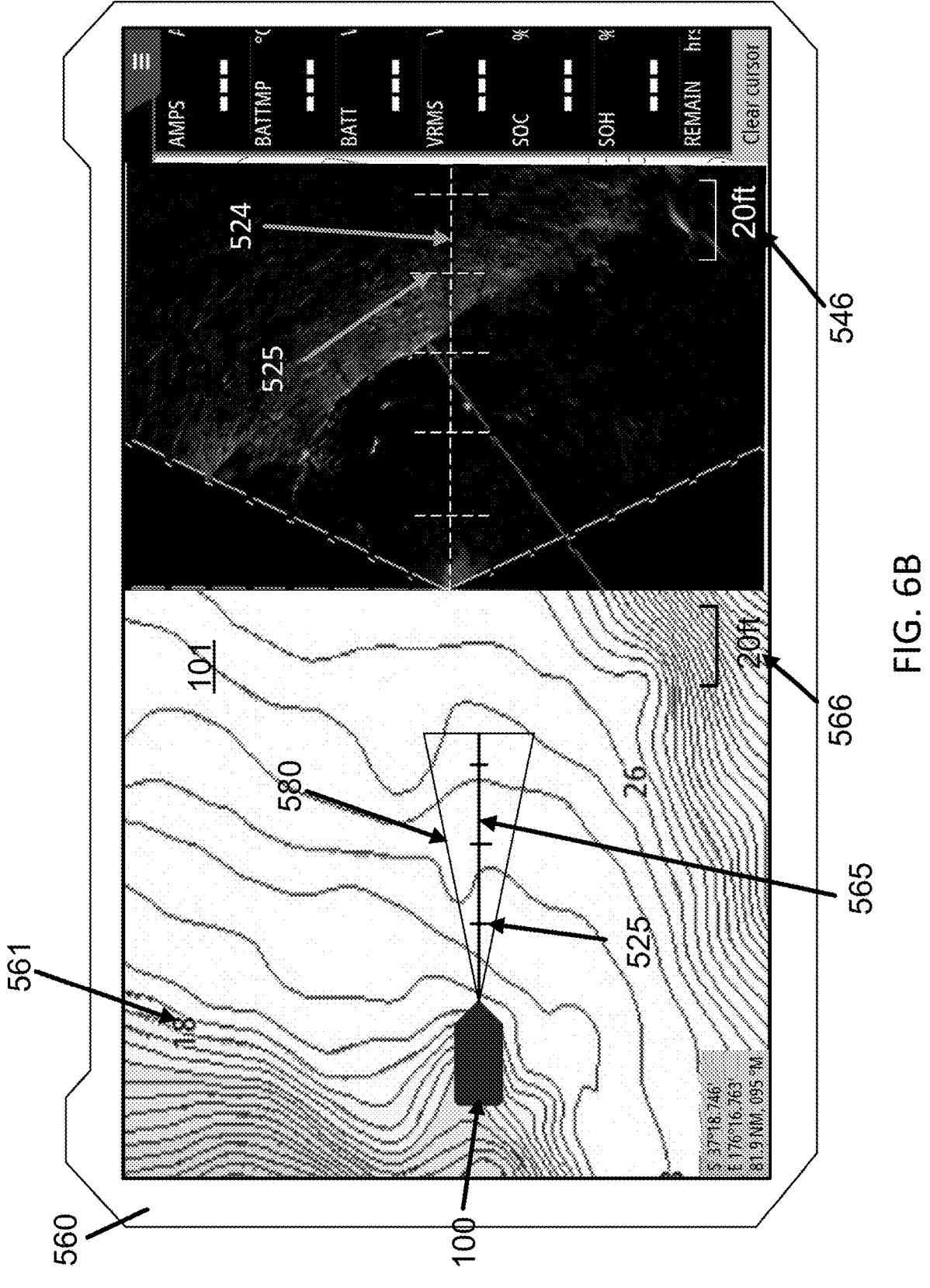
FIG. 6B illustrates the example display presenting the split screen presenting the sonar image at the sonar image scale and the navigational chart, shown in FIG. 6A, at a second zoom level, in accordance with some embodiments discussed herein.
Figure 6C:
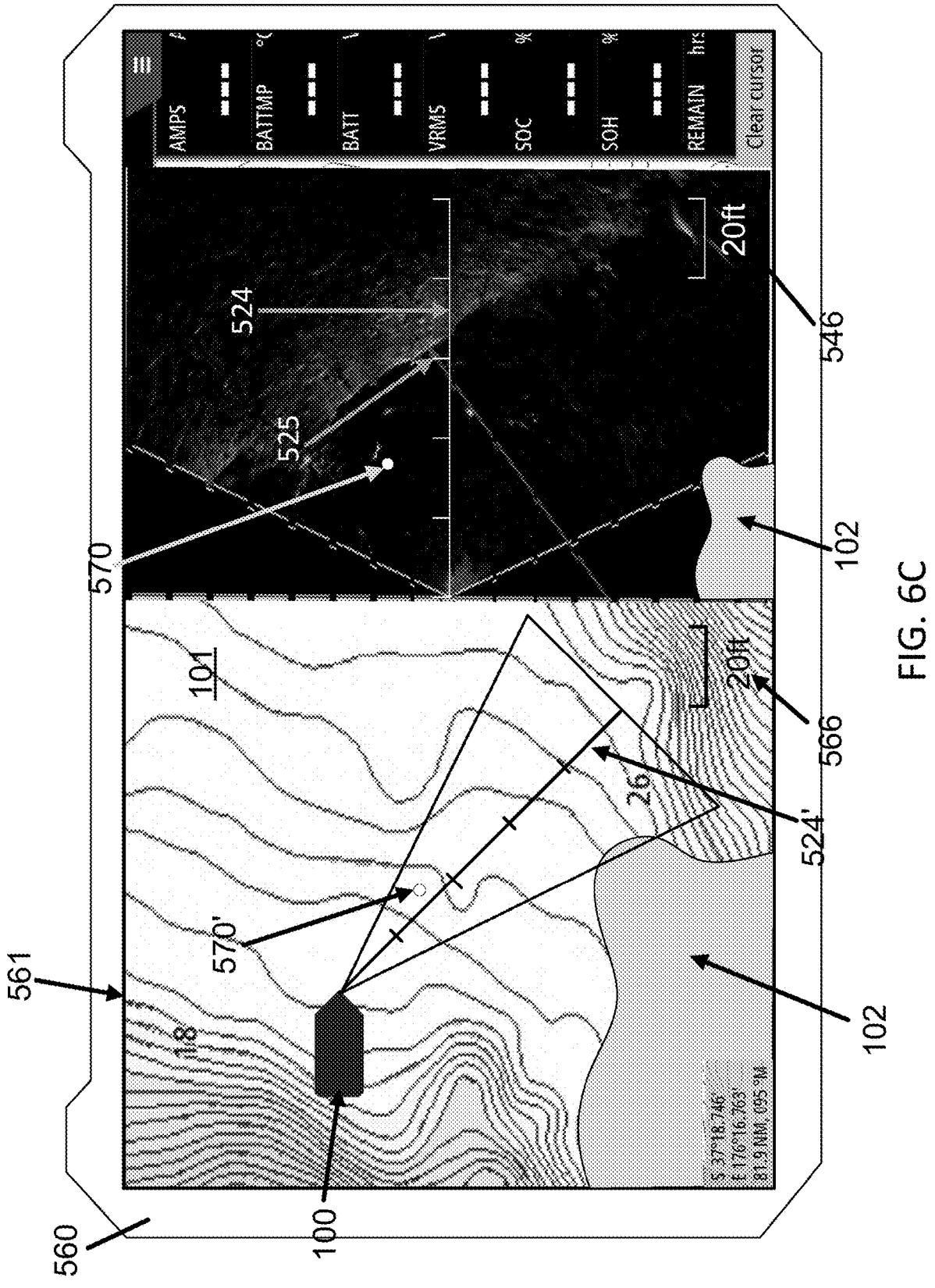
FIG. 6C illustrates the example display presenting the split screen presenting the sonar image at the sonar image scale and the navigational chart at the second zoom level, shown in FIG. 6B, depicting the position of an object detected in the sonar image on the navigational chart, in accordance with some embodiments discussed herein.

FIGS. 6A-C illustrate a marine electronics device 560 presenting a navigational chart 561 and a sonar image 540 in a split screen configuration. The navigational chart 561 includes a presentation of the watercraft 100 and a heading line 565, indicating the direction of travel. In this regard a user may visualize how far points of interests may be based on a chart scale 565. The heading line 565 may include scale lines 525 wherein the distance between each scale line 525 is equivalent to distance illustrated on the chart scale 566. Thus, the user can easily determine the distance between the bow of the watercraft 100 and objects, points of interest, and/or destinations.

The marine electronics device 560 may present a sonar image 540 generated by forward-facing sonar transducer. In some embodiments, the sonar image 540 may be generated and presented at a sonar image scale 546 which may be different than the chart scale 566, and thus, may be confusing for a user.

In the illustrated embodiment, the navigational chart 561 has a chart scale of 1 nautical mile, while the sonar image 540 has a sonar image scale of 20 feet. In this regard, in addition to the scales not being equivalent, they are presented in different measurement units. Although the lengths of the scales may look similar, the distance represented are 20 feet and about 6,076 feet.

In order to more intuitively present the sonar image 540 and the navigational chart 561 to the user, the system may adjust the chart scale 566 to be more similar (and, in some embodiments, the same) as the sonar image scale 546, as illustrated in FIG. 6B. Similarly, an extension line 524 may be presented in the sonar image 540. The extension line 524 may correspond to the heading line 565 presented on the navigational chart 561. Each of the extension line 524 and the heading line 565 may include scale lines 525 to denote the sonar image scale 546 within the sonar image 540 and the navigational chart 561 respectively. In this regard, a user may be able to determine the location of an object within the sonar image 540 and relate it to a position on the navigational chart and may be able to cast or navigate to that point to find the desired object. Notably, in some embodiments, the scale lines in the two images could be different, but the overall scales may still correlate to each other (e.g., the sonar image may have scale lines of 10 feet while the scale lines of the heading line may be 20 feet apart).

In some embodiments, rather than adjust the zoom level of the navigational chart, the system may adjust the spacing of the scale lines 525 on the heading line 565 to match the sonar image scale 546. Thus, the navigational chart 561 may be at the first zoom level, however, the scale lines 525 rather than indicating the chart scale 566 may be positioned according to the sonar image scale 546. In this regard, the user may relate the sonar image 540 to the navigational chart 561, while having a greater area presented on the navigational chart 561.

Additionally, in some embodiments, the system may present a sonar coverage 580 about the heading line 565. In some embodiments, the sonar coverage 580 may be an overlay of the area of the body of water 101 covered by the one or more sonar transducers generating the sonar image 540. In this regard, the sonar coverage 580 illustrated on the navigational chart 561 corresponds to the sonar image 540.

In some embodiments, such as illustrated in FIG. 6C, the sonar coverage 580 may be rotated on the navigational chart 561 to correspond to the orientation of the one or more sonar transducers. Thus, as a user rotates the one or more sonar transducer, or engages different sonar transducers, the sonar coverage 580 may reflect the orientation. In some embodiments, an extension line 524' may be presented within the sonar range 580 on the navigational chart 561. The extension line 524' may correspond to the extension line 524 presented on the sonar image 540. In some embodiments, each of the heading line 565 and the extension line 524' may be presented on the navigational chart 561.

In the illustrated embodiment, the an object 570 (e.g., a fish, animal, or other thing of interest) may be detected in the sonar image. The user may, utilizing a better corresponding chart zoom level (as shown in FIG. 6C), easily locate the real-world position of the object 570' (illustrated on the chart for explanation). For example, the user may determine that the object 570 is close to the second scale line 525 on the portside of the extension line 524, and about in line with a land indication 102 (e.g., a geographical marker). The user may note the position of the object 570 in relation chart markers (e.g., extension line and scale lines) and the geographical marker (e.g., land 102) and review the navigational chart 561 for the same region. Thus, in the illustrated embodiment, the user may look at the navigational chart 561 and determine an approximate location of the object 570' in the body of water 101. In some embodiments, the user may navigate towards the location 570' of the object 570' or use the estimated location as a guide of where to cast.

In some embodiments, the navigational chart 561 and the sonar image 540 may be evenly spaced on the marine electronics device, while in other embodiments the navigational chart 561 may be presented as a larger image than the sonar image 540. In some embodiments, the sonar image 540 may be larger than the presentation of the navigational chart 561.

In some embodiments, in response to a triggering event, the presentation of the navigational chart 561 may be adjusted to a second zoom level which corresponds to the sonar image scale 546. In this regard, the second zoom level may be different than the first zoom level.

In some embodiments, the triggering event may be the engagement of a sonar transducer, request for a split screen display between the sonar image and the navigational chart, engaging a structure mapping feature, adjusting the zoom level on the sonar image, changing the orientation of the one or more sonar transducers or any other event.

In an example embodiment, the extension line 525 illustrated in the sonar image 540 may correspond to a maximum distance presented within the sonar range. For example, as illustrated in FIG. 6C, the extension line 525 corresponds to 100 feet. The system may, based on the distance, adjust the presentation of the sonar image 540 and the navigational chart, such that the range of the sonar transducers, is present on the navigational chart 561. In this regard, the system would adjust the placement and position of the sonar image 540 relative to the navigational chart 561 such that over 100 feet from the watercraft 100 is visible on the navigational chart 561. In some embodiments, the system may have a determined percentage of visible range. For example, in some embodiments, the extension line 525 distance or sonar image overlay distance may take up 10% of the navigational chart (e.g., in the corresponding vertical or horizontal direction), 25% of the navigational chart 561 (e.g., in the corresponding vertical or horizontal direction), 40% of the navigational chart 561 (e.g., in the corresponding vertical or horizontal direction), 60% of the navigational chart (e.g., in the corresponding vertical or horizontal direction), or even 75% of the navigational chart 561 (e.g., in the corresponding vertical or horizontal direction).

In some embodiments, the user may adjust the sonar image scale 546. In this regard, the system may determine a new sonar image scale, and adjust the presentation of the navigational chart 561 to a third zoom level such that the chart scale corresponds to the adjusted sonar image scale.

Figure 7A:
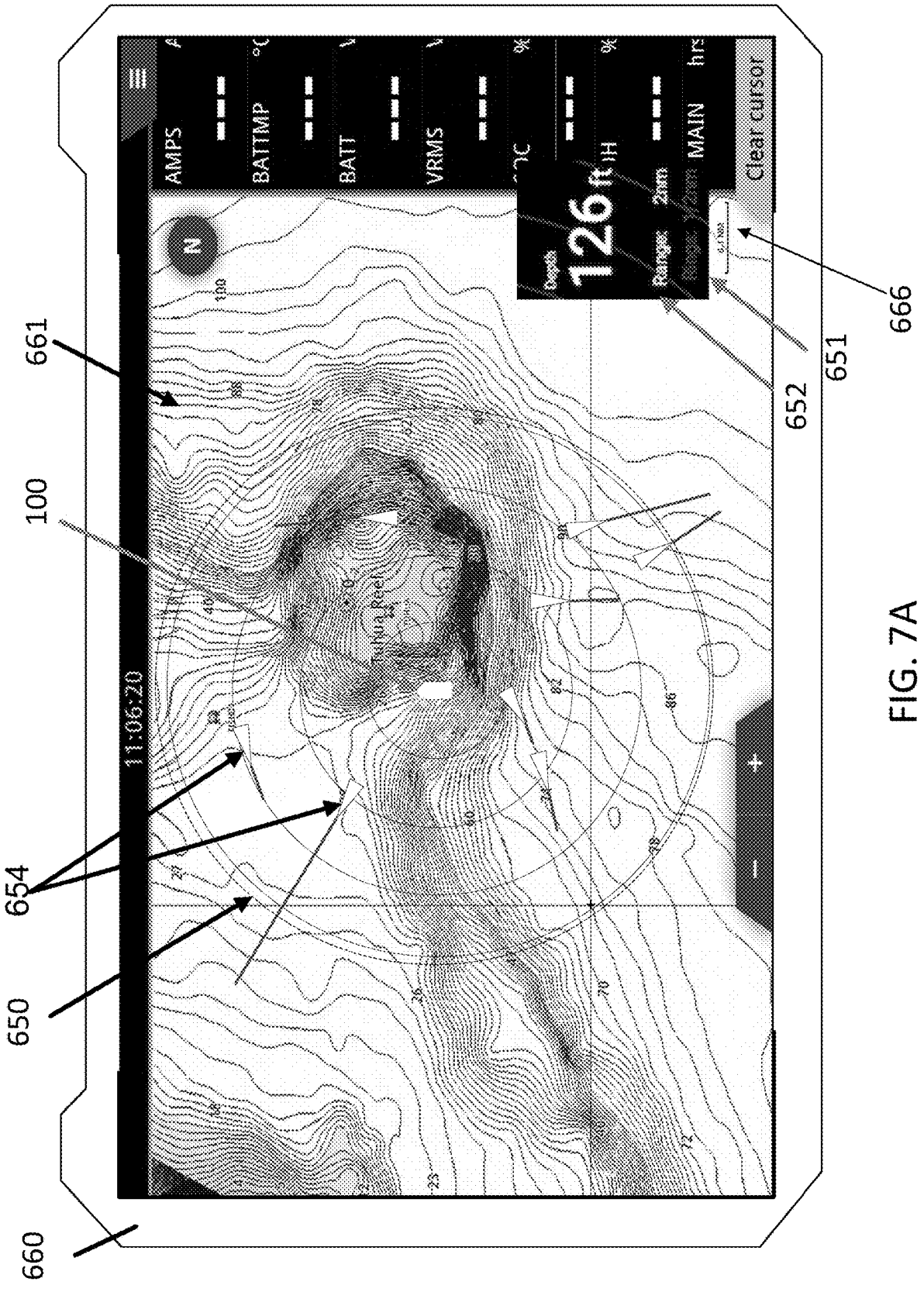
FIG. 7A illustrates an example display presenting a navigational chart at a first zoom level, and a radar image overlay at a radar image scale, in accordance with some embodiments discussed herein.
Figure 7B:
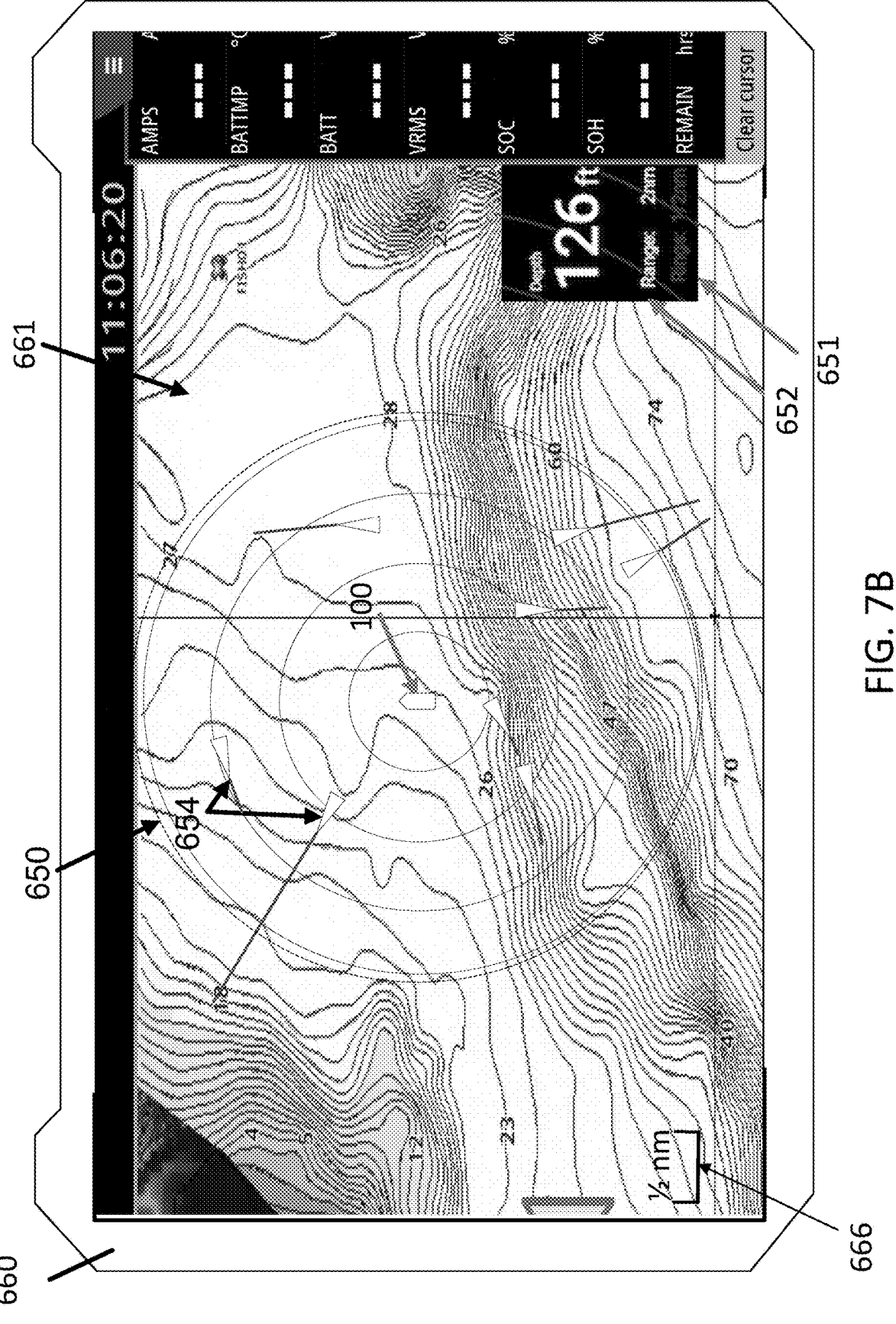
FIG. 7B illustrates the example display presenting the radar image overlay at the radar image scale, and the navigational chart, shown in FIG. 7A, at a second zoom level, in accordance with some embodiments discussed herein.

In some embodiments, the system may utilize radar. In this regard, the user may utilize a split screen of a navigational chart and a radar image and/or toggle back and forth between the navigational chart and the radar image; and correlate the two images to understand, for example, where other watercrafts, vessels, or similar (e.g., 654 FIG. 7A) may be and the heading directions of the detected watercrafts, vessels, or similar (e.g., 654 FIG. 7A). Radar may present similar issues to sonar in regards to zoom level scale. In some embodiments, a radar image may be overlaid on the navigational chart and, thus, similar issues of overlaying may arise with radar image overlay as with sonar image overlay. FIG. 7A illustrates an example radar overlay on a navigational chart and issues arising therefrom, and FIG. 7B illustrates a radar overlay that is presented to a scale over a navigational chart such that the radar image and the navigational chart better correspond for user interpretation and usage.

As discussed, navigational chart data and radar data may be compiled in two separate areas, and may generate charts and images separate from one another without regard to intuitively presenting information. FIG. 7A illustrates a radar image 650 overlaid onto a navigational chart 661. The navigational chart 661 is presented at a first zoom level corresponding to a chart scale 666 illustrating 0.1 nautical miles.

Similarly, the radar image 650 is presented at a radar image scale 651. The radar image scale 651 is the distance between two rings. In the example embodiment, the radar image scale 651 indicates the distance between two rings is 0.5 nautical miles. The radar image 650 further indicates a radar range 652 of 2 nautical miles. In this case, the radar image scale 651 is greater than the chart scale 666.

The system may determine the significant mismatch in the chart scale 666 and the radar image scale 651 and automatically adjust the navigational chart 661 to a second zoom level, such that the radar image scale 651 and the chart scale 666 better correspond (e.g., are within a multiple of each other (e.g., 2×, 5×, 1×, etc.) and/or are equal). FIG. 7B illustrates the situation where the radar image scale 651 and the chart scale 666 are equal and the radar image 650 is overlaid on the navigational chart 651 in a way that accurately depicts the location of other watercrafts, vessels, or similar 654 in relationship to the watercraft 100. Notably, as with the sonar image examples, in some embodiments, the system may simply adjust the zoom level of the chart and/or radar image to better correspond. In some such embodiments, the radar image and the chart may be presented in split screen mode.

System Architecture

Figure 8:
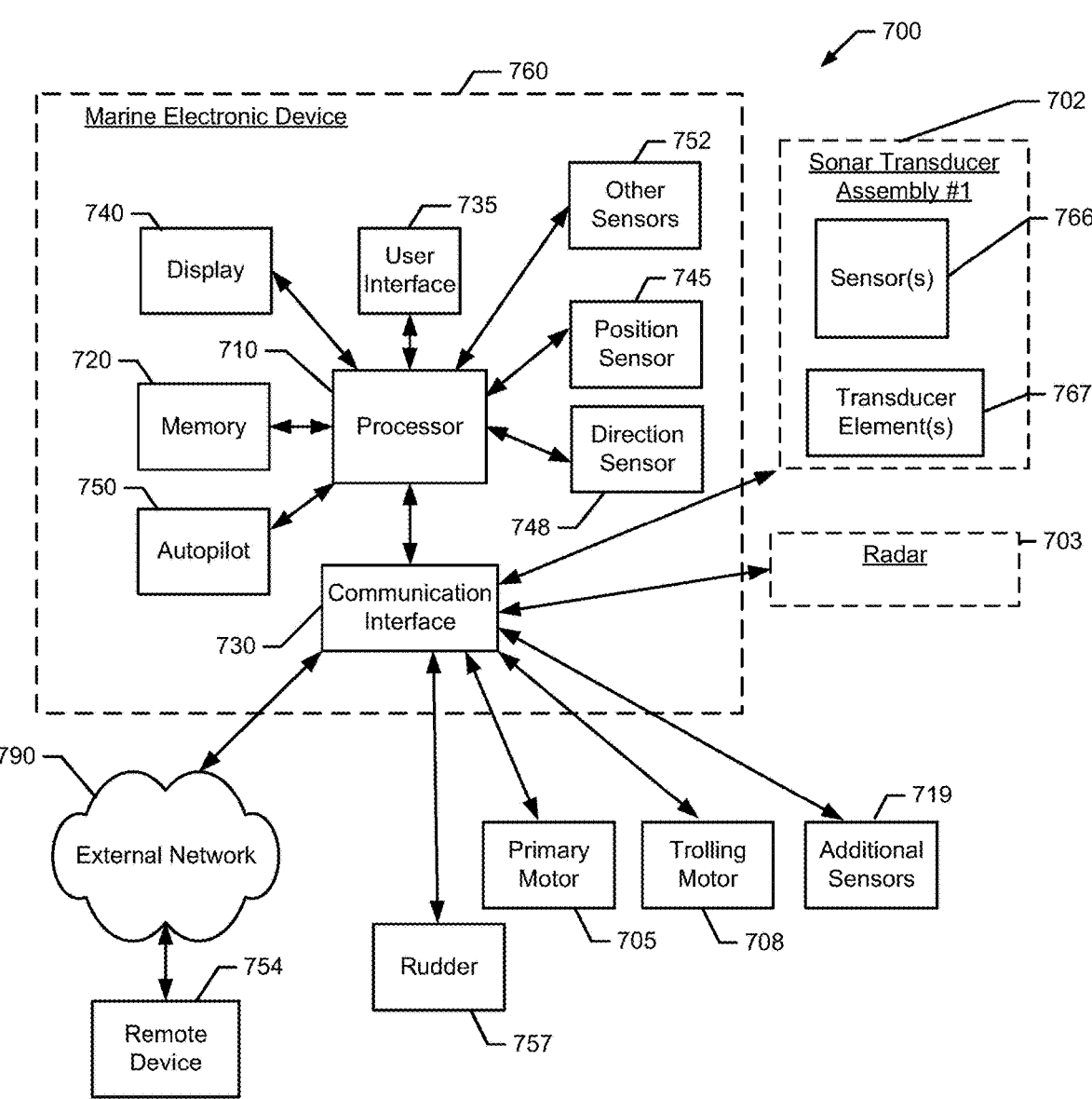
FIG. 8 illustrates a block diagram of an example system with various electronic devices, marine systems, and secondary devices shown, in accordance with some embodiments discussed herein.

FIG. 8 illustrates a block diagram of an example system 700 according to various embodiments of the present invention described herein. The illustrated system 700 includes a marine electronic device 760. In some embodiments the system 700 may comprise numerous marine devices. As shown in FIG. 8, one or more sonar transducer assemblies 702, and one or more radar 703 may be provided. One or more marine devices may be implemented on the marine electronic device 760. For example, a position sensor 745, a direction sensor 748, an autopilot 750, and other sensors 752 may be provided within the marine electronic device 760. These marine devices may be integrated within the marine electronic device 760, mounted on or otherwise attached to the watercraft at another location and connected to the marine electronic device 760, and/or the marine devices may be implemented as a or on a remote device 754 in some embodiments. The system 700 may include any number of different systems, modules, or components; each of which may comprise any device or means embodied in either hardware, software, or a combination of hardware and software configured to perform one or more corresponding functions described herein.

The marine electronic device 760 may include at least one processor 710, a memory 720, a communication interface 730, a user interface 735, a display 740, autopilot 750, and one or more sensors (e.g., position sensor 745, direction sensor 748, other sensors 752). One or more of the components of the marine electronic device 760 may be located within a housing or could be separated into multiple different housings (e.g., be remotely located).

The processor(s) 710 may be any means configured to execute various programmed operations or instructions stored in a memory device (e.g., memory 720) such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the at least one processor 710 as described herein. For example, the at least one processor 710 may be configured to analyze sonar data, radar data, and chart data, such as to correlate a chart scale and a sonar scale described herein (e.g., generate a navigational chart, determine a chart scale, generate a sonar image, determine a sonar image scale, adjust the chart scale to a second zoom level such that the chart scale better corresponds to the sonar image scale, etc.).

In some embodiments, the at least one processor 710 may be further configured to implement signal processing. In some embodiments, the at least one processor 710 may be configured to perform enhancement features to improve the display characteristics of data or images, collect or process additional data, such as time, temperature, GPS information, waypoint designations, current, environmental conditions (e.g., wind speed, wind direction) or others, or may filter extraneous data to better analyze the collected data.

In an example embodiment, the memory 720 may include one or more non-transitory storage or memory devices such as, for example, volatile and/or non-volatile memory that may be either fixed or removable. The memory 720 may be configured to store instructions, computer program code, sonar data, radar data, chart data, and additional data such as, bathymetric data, location/position data in a non-transitory computer readable medium for use, such as by the at least one processor 710 for enabling the marine electronic device 760 to carry out various functions in accordance with example embodiments of the present invention. For example, the memory 720 could be configured to buffer input data for processing by the at least one processor 710. Additionally or alternatively, the memory 720 could be configured to store instructions for execution by the at least one processor 710.

The communication interface 730 may be configured to enable communication to external systems (e.g., an external network 790). In this manner, the marine electronic device 760 may retrieve stored data from a remote device 754 via the external network 790 in addition to or as an alternative to the onboard memory 720. Additionally or alternatively, the marine electronics device 760 may store marine data locally, for example within the memory 720. Additionally or alternatively, the marine electronic device 760 may transmit or receive data, such as environmental conditions. In some embodiments, the marine electronic device 760 may also be configured to communicate with other devices or systems (such as through the external network 790 or through other communication networks, such as described herein). For example, the marine electronic device 760 may communicate with a propulsion system of the watercraft 100 (e.g., for autopilot control); a remote device (e.g., a user's mobile device, a handheld remote, etc.); or another system. Using the external network 790, the marine electronic device 760 may communicate with and send and receive data with external sources such as a cloud, server, etc. The marine electronic device 760 may send and receive various types of data. For example, the system may receive weather data, tidal data, alert data, current data, among others. However, this data is not required to be communicated using external network 790, and the data may instead be communicated using other approaches, such as through a physical or wireless connection via the communication interface 730.

The communication interface 730 of the marine electronic device 760 may also include one or more communications modules configured to communicate with one another in any of a number of different manners including, for example, via a network. In this regard, the communication interface 730 may include any of a number of different communication backbones or frameworks including, for example, Ethernet, the NMEA 2000 framework, GPS, cellular, Wi-Fi, or other suitable networks. The network may also support other data sources, including GPS, autopilot, engine data, compass, radar, etc. In this regard, numerous other peripheral devices (including other marine electronic devices or sonar transducer assemblies) may be included in the system 700.

The position sensor 745 may be configured to determine the current position and/or location associated with travel of the marine electronic device 760 (and/or the watercraft 100). For example, the position sensor 745 may comprise a GPS, bottom contour, inertial navigation system, such as machined electromagnetic sensor (MEMS), a ring laser gyroscope, or other location detection system. Additionally or alternately, the position sensor 745 may be configured to determine the orientation of the watercraft 100. Alternatively or in addition to determining the location of the marine electronic device 760 or the watercraft 100, the position sensor 745 may also be configured to determine the position and/or orientation of an object outside of the watercraft 100. In some embodiments, the position sensor 745 may be configured to determine a location associated with travel of the watercraft. For example, the position sensor 745 may utilize other sensors 752 (e.g., speed sensor, and/or direction sensor 748) to determine a future position of the watercraft 100 and/or a waypoint along the route of travel.

The display 740 (e.g., one or more screens) may be configured to present images and may include or otherwise be in communication with a user interface 735 configured to receive input from a user. The display 740 may be, for example, a conventional LCD (liquid crystal display), a touch screen display, mobile device, or any other suitable display known in the art upon which images may be displayed.

In some embodiments, the display 740 may present one or more sets of data (or images generated from the one or more sets of data). Such data includes chart data, radar data, sonar data, weather data, location data, position data, orientation data, environmental data, sonar data, or any other type of information relevant to the watercraft. Environmental data may be received from the external network 790, retrieved from the other sensors 752, and/or obtained from sensors positioned at other locations, such as remote from the watercraft. Additional data may be received from marine devices such as a radar, a primary motor 705 or an associated sensor, a trolling motor 708 or an associated sensor, an autopilot 750, a rudder 757 or an associated sensor, a position sensor 745, a direction sensor 748, additional sensors 719, a remote device 754, onboard memory 720 (e.g., stored chart data, historical data, stored sonar data, etc.), or other devices.

In some further embodiments, various sets of data, referred to above, may be superimposed or overlaid onto one another. In some embodiments, the processor 710 may be configured to correlate the data sets to present on the display 740 such that each of the data sets present information for the same area. For example, the processor 710 may receive a first sonar data set from the one or more sonar transducers 702. The processor 710 may retrieve a chart data set from the memory 720. The processor 710 may generate a navigational chart from the chart data and display the navigational chart at a last used zoom level with a chart scale. Upon receipt of the sonar data, the processor 710 may generate a sonar image and determine a sonar image scale. The processor 710 may determine if the chart scale is different than the sonar image scale, and if the chart scale is different than the sonar image scale, the processor 710 may adjust the zoom level of the navigational chart such that the chart scale is equal to the sonar image scale.

The user interface 735 may include, for example, a keyboard, keypad, function keys, mouse, scrolling device, input/output ports, touch screen, or any other mechanism by which a user may interface with the system.

Although the display 740 of FIG. 8 is shown as being directly connected to the at least one processor 710 and within the marine electronic device 760, the display 740 could alternatively be remote from the at least one processor 710 and/or marine electronic device 760. Likewise, in some embodiments, the position sensor 745 and/or user interface 735 could be remote from the marine electronic device 760.

The marine electronic device 760 may include one or more other sensors/devices 752, such as configured to measure or sense various other conditions. The other sensors/devices 752 may include, for example, an air temperature sensor, a water temperature sensor, a current sensor, a light sensor, a wind sensor, a speed sensor, tide sensor, or the like.

The components presented in FIG. 8 may be rearranged to alter the connections between components. For example, in some embodiments, a marine device outside of the marine electronic device 760, such as the radar, may be directly connected to the at least one processor 710 rather than being connected to the communication interface 730. Additionally, sensors and devices implemented within the marine electronic device 760 may be directly connected to the communication interface 730 in some embodiments rather than being directly connected to the at least one processor 710

Example Flowchart(s)

Embodiments of the present invention provide methods, apparatus and computer program products for operating according to various embodiments described herein. Various examples of the operations performed in accordance with embodiments of the present invention will now be provided with reference to FIGS. 9-10.

FIG. 9 is a flowchart illustrating an example method 800 for correlating the zoom levels and scales of a navigational chart and a sonar image. At operation 810, presentation of a chart including a representation of at least a portion of a body of water is caused on a display, at a first zoom level. At operation 820, one or more sonar beams is emitted into an underwater environment. At operation 830, sonar return data is received, the sonar return data corresponding to sonar returns received by at least one sonar transducer. At operation 840, a sonar image is generated. The sonar image presented based on a sonar image scale. At operation 850, presentation of the sonar image is caused on the display. At operation 860, the presentation of the chart is adjusted to a second zoom level, the second zoom level corresponding to the sonar image scale. In some embodiments, the chart may be adjusted to the second zoom level automatically or in response to a triggering event.

FIG. 10 is a flowchart illustrating an example method 900 for correlating zoom levels and scales of a navigational chart and a radar image. At operation 910, presentation of a chart including a representation of at least a portion of a body of water is caused on a display, at a first zoom level. At operation 920, one or more electromagnetic waves are emitted into an underwater environment. At operation 930, radar return data is received, the radar return data corresponding to the radar returns received by at least one radar. At operation 940, a radar image is generated. The radar image is presented based on a radar image scale. At operation 950, presentation of the radar image is caused on the display. At operation 960, the presentation of the chart is adjusted to a second zoom level, the second zoom level corresponding to the radar image scale.

In some embodiments, the methods 800 and 900 may be executed by a processor and may be stored as software instructions and/or computer program code in a non-transitory computer readable medium and/or memory. However, the methods may be performed by a wide variety of items. Additionally, the operations of methods 800 and 900 may be performed in various orders, and some of the operations may be performed simultaneously in some embodiments. Some of the operations of methods 800 and 900 may not be performed in some embodiments. In some embodiments, additional operations may be included in the methods 800 and 900.

FIGS. 9-10 illustrate flowcharts of a system, method, and computer program product according to example embodiments. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 720 and executed by, for example, the processor 710. As will be appreciated, any such computer program product may be loaded onto a computer or other programmable apparatus (for example, a marine electronic device 760) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 760) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the invention set forth herein will come to mind to one skilled in the art to which these inventions pertain having the benefit of the teachings presented in the foregoing descriptions and associated drawings. Therefore, it is to be understood that the embodiments of the invention are not to be limited to the specific embodiments disclosed and that modifications and other embodiments are intended to be included within the score of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposed of limitation.

What is claimed is:

1. A system for presenting marine data, the system comprising:
    at least one sonar transducer associated with a watercraft, wherein the at least one sonar transducer is configured to emit one or more sonar beams into an underwater environment of a body of water in a direction relative to the watercraft;
    a display;
    one or more processors;
    memory including computer program code configured to, when executed, cause the one or more processors to:
        cause, on the display, presentation of a chart including a representation of at least a portion of the body of water, wherein the chart is presented at a first zoom level;
        cause the one or more sonar transducers to emit the one or more sonar beams into the underwater environment;
        receive sonar return data corresponding to sonar returns received by the at least one sonar transducer;
        generate a sonar image corresponding to the sonar return data, wherein the sonar image is presented based on a sonar image scale;
        determine a distance corresponding to a maximum presented sonar range within the sonar image scale;
        cause, on the display, presentation of the sonar image on the chart relative to a representation of the watercraft;
        determine, based on the determined distance corresponding to the maximum presented sonar range, a second zoom level of the chart that corresponds to the sonar image scale such that a length of the sonar image extending from the representation of the watercraft or a length of a representation of the distance extending from the representation of the watercraft covers at least 25% of a length of the chart; and adjust, in an instance in which the length of the sonar image extending from the representation of the watercraft or the length of the representation of the distance extending from the representation of the watercraft does not cover at least 25% of the length of the chart, presentation of the chart to the second zoom level that corresponds to the sonar image scale, wherein the second zoom level is different than the first zoom level.

2. The system of claim 1, wherein the computer program code is further configured to, when executed, cause the one or more processors to:
    receive input from a user adjusting the sonar image scale; and
    adjust, automatically, presentation of the chart to a third zoom level that corresponds to the adjusted sonar image scale.

3. The system of claim 1, wherein the computer program code is further configured to, when executed, cause the one or more processors to:
    cause, on the display, presentation of an extension line, wherein the extension line defines a length,
    wherein the length of the extension line corresponds to the distance of the presented sonar range.

4. The system of claim 3, wherein the computer program code is further configured to, when executed, cause the one or more processors to:
    determine an orientation of the at least one sonar transducer in the direction relative to the watercraft; and
    cause, on the display, presentation of the extension line in the direction of the at least one sonar transducer.

5. The system of claim 3, wherein the computer program code is further configured to, when executed, cause the one or more processors to:
    cause, on the display, presentation of one or more scale lines on the presentation of the sonar image; and
    cause, on the display, presentation of one or more scale lines on the extension line.

6. The system of claim 3, wherein the computer program code is further configured to, when executed, cause the one or more processors to:
    detect a location of an object within the sonar image; and
    cause, on the display, an indication of the object about the extension line corresponding to the location of the object detected within the sonar image.

7. A system for presenting marine data, the system comprising:
    at least one sonar transducer associated with a watercraft, wherein the at least one sonar transducer is configured to emit one or more sonar beams into an underwater environment of a body of water in a direction relative to the watercraft;
    a display;
    one or more processors;
    memory including computer program code configured to, when executed, cause the one or more processors to:
        cause, on the display, presentation of a chart including a representation of at least a portion of the body of water, wherein the chart is presented at a first zoom level;
        cause the one or more sonar transducers to emit the one or more sonar beams into the underwater environment;
        receive sonar return data corresponding to sonar returns received by the at least one sonar transducer;
        determine a distance of the one or more sonar beams, wherein the distance corresponds to a sonar range;

generate a sonar image corresponding to the sonar return data, wherein the sonar image is presented based on a sonar image scale;

cause, on the display, presentation of the sonar image on the chart relative to a representation of the watercraft on the chart;

determine, based on the determined distance, a second zoom level of the chart that corresponds to the sonar image scale such that a length of the sonar image extending from the representation of the watercraft or a length of a representation of the distance extending from the representation of the watercraft covers at least 25% of a length of the chart; and adjust, based on the determination of the second zoom level, presentation of the chart to the second zoom level that corresponds to the sonar range, such that the sonar range covers at least 25% of the chart, wherein the second zoom level is different than the first zoom level.

8. The system of claim 7, wherein the computer program code is further configured to, when executed, cause the one or more processors to:

cause, on the display, presentation of a representation of the sonar range on the chart relative to a representation of the watercraft on the chart.

9. The system of claim 8, wherein the computer program code is further configured to, when executed, cause the one or more processors to:

determine an orientation of the at least one sonar transducer in the direction relative to the watercraft; and cause, on the display, presentation of the representation of sonar range in the direction of the at least one sonar transducer.

10. A system for presenting marine data, the system comprising:

at least one sonar transducer associated with a watercraft, wherein the at least one sonar transducer is configured to emit one or more sonar beams into an underwater environment of a body of water in a direction relative to the watercraft;

a display;

one or more processors;

memory including computer program code configured to, when executed, cause the one or more processors to:

cause, on the display, presentation of a chart including a representation of at least a portion of the body of water, wherein the chart is presented at a chart scale;

cause the one or more sonar transducers to emit the one or more sonar beams into the underwater environment;

receive sonar return data corresponding to sonar returns received by the at least one sonar transducer;

generate a sonar image corresponding to the sonar return data, wherein the sonar image comprise a sonar image scale;

determine a distance corresponding to a maximum presented sonar range within the sonar image scale;

cause on the display, presentation of the sonar image adjacent the chart;

determine, based on the determined distance corresponding to the maximum presented sonar range, a second chart scale of the chart that corresponds to the sonar image scale such that a length of the sonar image would cover at least 25% of a length of the chart if overlayed on the chart to dimension; and adjust, in an instance in which the length of the sonar image, if overlayed on the chart, does not cover at least 25% of the length of the chart, presentation of the chart to the second chart scale, wherein the second chart scale is different than the first chart scale.

11. The system of claim 10, wherein the computer program code is further configured to, when executed, cause the one or more processors to:

receive input from a user adjusting the sonar image scale; and adjust, automatically, the chart scale to correspond to the adjusted sonar image scale.

12. A system for presenting marine data, the system comprising:

at least one sonar transducer associated with a watercraft, wherein the at least one sonar transducer is configured to emit one or more sonar beams into an underwater environment of a body of water in a direction relative to the watercraft;

a display;

one or more processors;

memory including computer program code configured to, when executed, cause the one or more processors to:

cause, on the display, presentation of a chart including a representation of at least a portion of the body of water, wherein the chart is presented at a first zoom level;

cause, on the display, presentation of a heading line relative to a representation of the watercraft, wherein the heading line comprises scale lines corresponding to the first zoom level;

cause the one or more sonar transducers to emit the one or more sonar beams into the underwater environment;

receive sonar return data corresponding to sonar returns received by the at least one sonar transducer;

determine a distance of the one or more sonar beams, wherein the distance corresponds to a sonar range;

generate a sonar image corresponding to the sonar return data, wherein the sonar image is presented based on a sonar image scale;

cause, on the display, presentation of the sonar image;

determine, based on the determined distance, a second zoom level of the chart that corresponds to the sonar image scale such that, at the second zoom level, the heading line extending from the representation of the watercraft covers at least 25% of a length of the chart; and adjust, based on the determination of the second zoom level, presentation of the scale lines to the second zoom level such that the second zoom level corresponds to the sonar image scale.

* * * * *